(12) United States Patent
Duan et al.

(10) Patent No.: US 8,198,882 B2
(45) Date of Patent: Jun. 12, 2012

(54) POWER CONVERTING DEVICE WITH HIGH POWER TRANSFORMATION EFFICIENCY

(75) Inventors: Rou-Yong Duan, Guosing Township, Nantou County (TW); Chao-Tsung Chang, Daya Township, Taichung County (TW)

(73) Assignee: Hungkuang University, Shalu (TW)

( * ) Notice: Subject to any disclaimer, the term of this patent is extended or adjusted under 35 U.S.C. 154(b) by 510 days.

(21) Appl. No.: 12/470,246

(22) Filed: May 21, 2009

(65) Prior Publication Data
US 2010/0296325 A1 Nov. 25, 2010

(51) Int. Cl.
*H03F 9/04* (2006.01)
*H01F 29/02* (2006.01)
*H01F 17/00* (2006.01)
*H02M 7/5387* (2007.01)

(52) U.S. Cl. ......... 323/333; 323/346; 323/363; 363/132
(58) Field of Classification Search .................. 363/132; 323/363, 346, 333
See application file for complete search history.

(56) References Cited

U.S. PATENT DOCUMENTS

| | | | |
|---|---|---|---|
| 6,330,170 B1* | 12/2001 | Wang et al. | 363/37 |
| 7,522,437 B2* | 4/2009 | Konishi et al. | 363/132 |
| 2002/0064058 A1* | 5/2002 | Zhang et al. | 363/17 |
| 2004/0165408 A1* | 8/2004 | West et al. | 363/131 |
| 2007/0236966 A1* | 10/2007 | Uruno et al. | 363/20 |
| 2008/0037305 A1* | 2/2008 | West | 363/132 |
| 2008/0247194 A1* | 10/2008 | Ying et al. | 363/17 |
| 2009/0058302 A1* | 3/2009 | Nerone | 315/70 |

* cited by examiner

*Primary Examiner* — Adolf Berhane
*Assistant Examiner* — Gary Nash
(74) *Attorney, Agent, or Firm* — Sunstein Kann Murphy & Timbers LLP

(57) ABSTRACT

A power converting device converts a DC voltage input from an external power source into an AC voltage output across an output capacitor of an output circuit, and includes a coupling circuit having series first and second windings. A rectifying diode has a grounded anode coupled to an anode of a clamp diode, and a cathode coupled to the second winding. A cathode of the clamp diode is coupled to a clamp switch and the first winding. A full-bridge circuit includes a first series connection of first and second switches, and a second series connection of third and fourth switches. The first and second series connections are coupled in parallel between the first winding and ground. The output capacitor is coupled between a first common node between the first and second switches, and a second common node between the third and fourth switches.

7 Claims, 25 Drawing Sheets

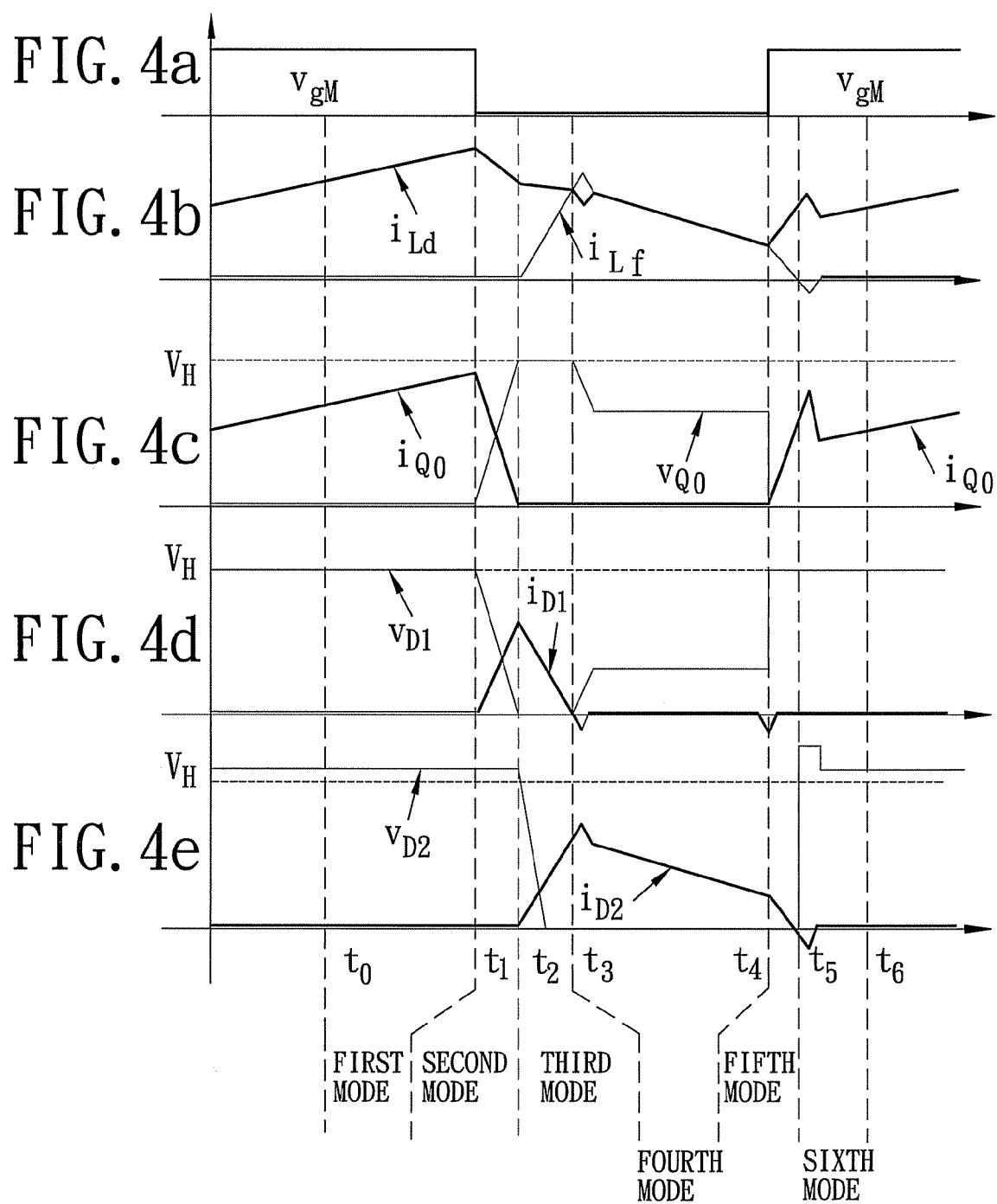

POWER CONVERTING DEVICE WITH HIGH POWER TRANSFORMATION EFFICIENCY

BACKGROUND OF THE INVENTION

1. Field of the Invention

The invention relates to a power converting device, more particularly to a DC-to-AC power converting device.

2. Description of the Related Art

FIG. 1 illustrates a conventional power converting device proposed in an article by R. J. Wai and R. Y. Duan, entitled "High-efficiency power conversion for low power fuel cell generation system", IEEE Trans. Power Electronics, vol. 20, no. 4, pp. 874-856, July 2005. The conventional power converting device is adapted for converting a DC voltage input from an external power source into an AC voltage output, such as a sinusoidal signal, and includes a transformer 10, an input diode 13, a clamp circuit 14, a full-bridge circuit 15, and an output capacitor 16.

The transformer 10 includes first and second windings 11, 12 each having a polarity end and a non-polarity end. The polarity end of the first winding 11 is coupled to the external power source. The polarity end of the second winding 12 is coupled to ground.

The input diode 13 has an anode coupled to the non-polarity end of the second winding 12, and a cathode coupled to the polarity end of the first winding 11.

The clamp circuit 14 includes a clamp capacitor 145, first and second clamp diodes 143, 144, and first and second clamp switches 141, 142 each having first and second ends, and a control end for receiving a control signal from a control circuit 17, and each operable between an ON-state and an OFF-state in response to the control signal from the control circuit 17. The first end of the first clamp switch 141 and an anode of the second clamp diode 144 are coupled to the non-polarity end of the first winding 11. The second end of the first clamp switch 141 is coupled to an anode of the first clamp diode 143. The second end of the second clamp switch 142 is coupled to a cathode of the second clamp diode 144. The first end of the second clamp switch 142 is coupled to a cathode of the first clamp diode 143. The clamp capacitor 145 is coupled between a common node (p1) between the second end of the first clamp switch 141 and the anode of the first clamp diode 143, and a common node (p2) between the cathode of the second clamp diode 144 and the second end of the second clamp switch 142.

The full-bridge circuit 15 includes a first series connection of a first diode 151, first and second switches 155, 156, and a second diode 152, and a second series connection of a third diode 153, third and fourth switches 157, 158, and a fourth diode 154. The first and second series connections are coupled in parallel between the cathode of the first clamp diode 143 and ground. Each of the first, second, third and fourth switches 155, 156, 157, 158 has a control end for receiving an external control signal from the control circuit 17, and is operable between an ON-state and an OFF-state in response to the control signal from the control circuit 17.

The output capacitor 16 is coupled between a common node (p3) between the first and second switches 155, 156, and a common node (p4) between the third and fourth switches 157, 158. The AC voltage output is a voltage across the output capacitor 16.

Since the operation of the conventional power converting device is described in detail in the aforesaid article, further discussion of the same is omitted herein for the sake of brevity. The following are some of the drawbacks of the conventional power converting device:

1. Due to the presence of the diodes 151, 152, 153, 154, a loop current is generated and conduction loss is increased when the AC voltage output is switched from one of positive and negative halves of the sinusoidal signal to the other one of the positive and negative halves of the sinusoidal signal.

2. The first and second windings 11, 12 are wound in a complicated sandwich winding manner to enhance a coupling coefficient of the transformer 10. A current flowing through the second winding 12 flows back to the external power source. As a result, energy attributed to the second winding is up to a third of that attributed to the voltage output. Therefore, it is necessary to avoid occurrence of a large loop current that is not introduced to an output side.

SUMMARY OF THE INVENTION

Therefore, an object of the present invention is to provide a power converting device that can overcome the aforesaid drawbacks of the prior art.

According to the present invention, there is provided a power converting device for converting a DC voltage input from an external power source into an AC voltage output. The power converting device comprises:

a coupling circuit including first and second windings each having a polarity end and a non-polarity end, the polarity end of the first winding being coupled to the non-polarity end of the second winding;

a rectifying diode having a grounded anode, and a cathode coupled to the polarity end of the second winding;

a clamp diode having a grounded anode, and a cathode coupled to the polarity end of the first winding;

a clamp switch adapted to be coupled between the external power source and the cathode of the clamp diode, and operable between an ON-state and an OFF-state;

a full-bridge circuit including a first series connection of first and second switches, and a second series connection of third and fourth switches, the first and second series connections being coupled in parallel between the non-polarity end of the first winding and ground, each of the first, second, third and fourth switches being operable between an ON-state and an OFF-state; and an output circuit including an output capacitor coupled between a first common node between the first and second switches, and a second common node between the third and fourth switches, the AC voltage output being a voltage across the output capacitor.

BRIEF DESCRIPTION OF THE DRAWINGS

Other features and advantages of the present invention will become apparent in the following detailed description of the preferred embodiments with reference to the accompanying drawings, of which:

FIGS. 3d and 4a illustrate a waveform of a control signal ($v_{gM}$) for a clamp switch of the first preferred embodiment;

FIG. 4b illustrates waveforms of currents ($i_{Ld}$, $i_{Lf}$) flowing respectively through first and second windings of a coupling circuit of the first preferred embodiment;

FIG. 4c illustrates waveforms of a current ($i_{Q0}$) flowing through the clamp switch, and a voltage ($v_{Q0}$) across the clamp switch;

FIG. 4d illustrates waveforms of a current ($i_{D1}$) flowing through a clamp diode of the first preferred embodiment, and a voltage ($v_{D1}$) across the clamp diode;

FIG. 4e illustrates waveforms of a current ($i_{D2}$) flowing through a rectifying diode of the first preferred embodiment, and a voltage ($v_{D2}$) across the rectifying diode;

DETAILED DESCRIPTION OF THE PREFERRED EMBODIMENTS

Figure 1:
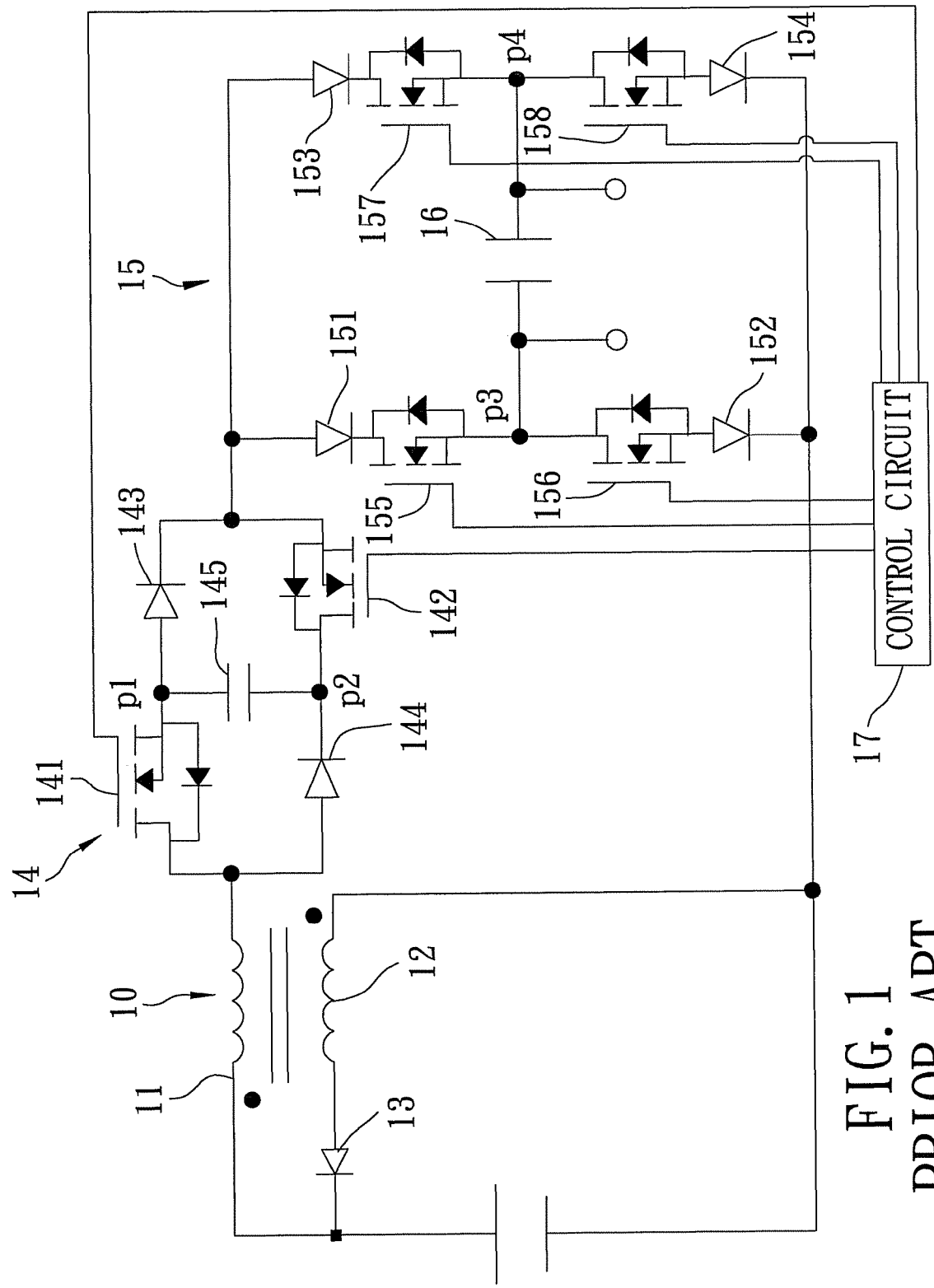
FIG. 1 is a schematic electrical circuit diagram illustrating a conventional power converting device.

Before the present invention is described in greater detail, it should be noted that like elements are denoted by the same reference numerals throughout the disclosure.

Figure 2:
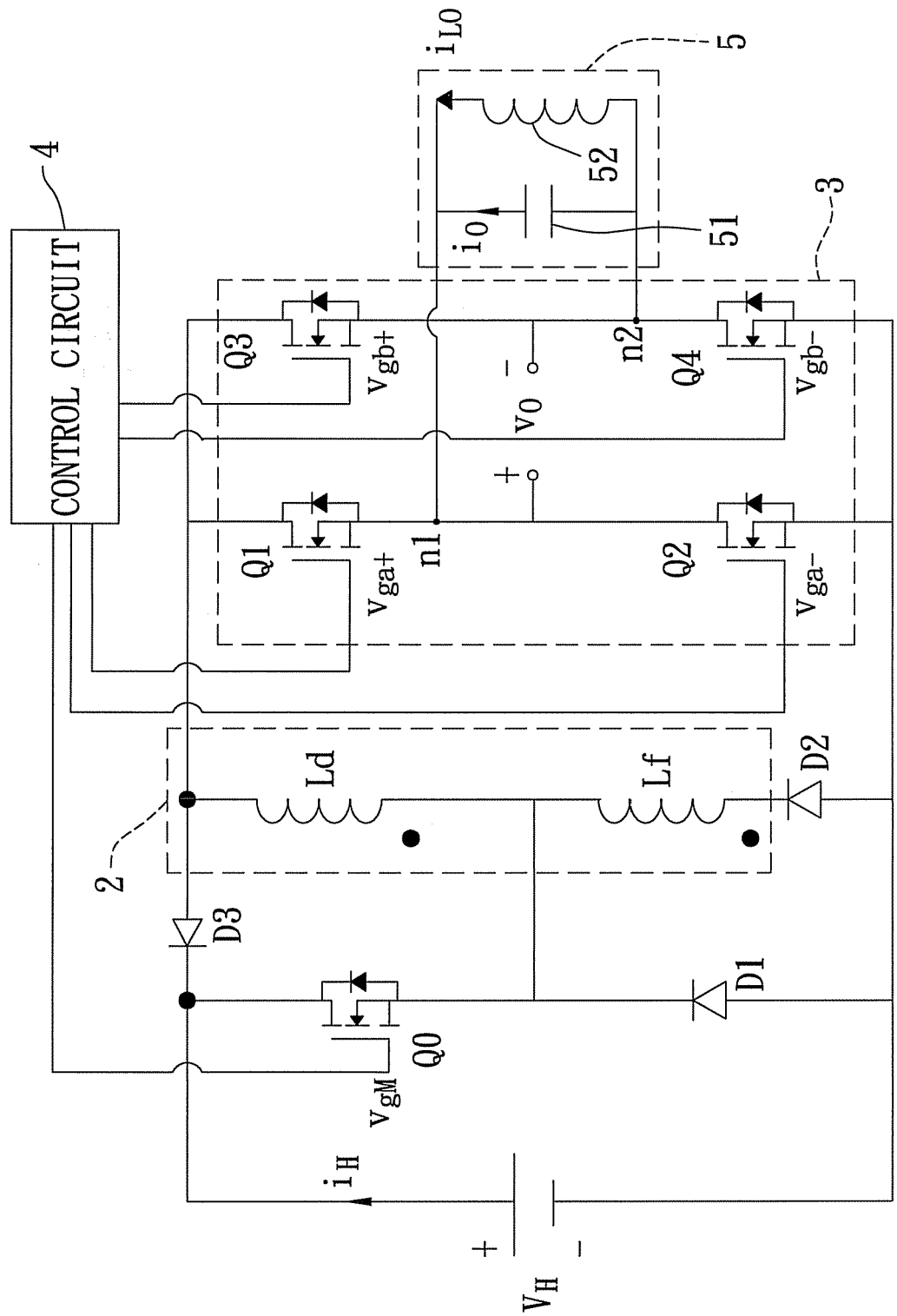
FIG. 2 is a schematic electrical circuit diagram illustrating the first preferred embodiment of a power converting device according to the present invention.

Referring to FIG. 2, the first preferred embodiment of a power converting device according to the present invention is shown to be adapted for converting a DC voltage input ($V_H$) from an external power source into an AC voltage output, such as a sinusoidal signal. The power converting device includes a coupling circuit 2, a rectifying diode (D2), a clamp diode (D1), a feedback diode (D3), a clamp switch (Q0), a full-bridge circuit 3, and an output circuit 5.

The coupling circuit 2 includes first and second windings (Ld, Lf) wound around an iron core (not shown). A winding ratio of the first and second windings (Ld, Lf) is equal to 1:N. Each of the first and second windings (Ld, Lf) has a polarity end and a non-polarity end. The polarity end of the first winding (Ld) is coupled to the non-polarity end of the second winding (Lf).

The rectifying diode (D2) has a grounded anode, and a cathode coupled to the polarity end of the second winding (Lf).

The feedback diode (D3) has an anode coupled to the non-polarity end of the first winding (Ld), and a cathode adapted to be coupled to the external power source.

The clamp diode (D1) has a grounded anode, and a cathode coupled to the polarity end of the first winding (Ld).

The clamp switch (Q0) is adapted to be coupled between the external power source and the cathode of the clamp diode (D1). The clamp switch (Q0) has a control end for receiving a control signal ($v_{gM}$). The clamp switch (Q0) is operable to switch between an ON-state and an OFF-state in response to the control signal ($v_{gM}$).

The full-bridge circuit 3 includes a first series connection of first and second switches (Q1, Q2), and a second series connection of third and fourth switches (Q3, Q4). The first and second series connections are coupled in parallel between the non-polarity end of the first winding (Ld) and ground. Each of the first, second, third and fourth switches (Q1, Q2, Q3, Q4) has a control end for receiving a control signal ($v_{ga+}$, $v_{ga-}$, $V_{gb+}$, $v_{gb-}$) and is operable between an ON-state and an OFF-state in response to the control signal ($v_{ga+}$, $v_{ga-}$, $v_{gb+}$, $V_{gb-}$). In this embodiment, the first and third switches (Q1, Q3) are coupled to the non-polarity end of the first winding (Ld), and the second and fourth switches (Q2, Q4) are coupled to ground. The first and fourth switches (Q1, Q4) are simultaneously in the ON-state, and the second and third switches (Q2, Q3) are simultaneously in the ON-state. When the first and fourth switches (Q1, Q4) are in the ON-state, the second and third switches (Q2, Q3) are in the OFF-state. It is noted that, during the ON-state of any one of the first, second, third and fourth switches (Q1, Q2, Q3, Q4), the clamp switch (Q0) is switched at a frequency higher than that of any one of the first, second, third and fourth switches (Q1, Q2, Q3, Q4).

Figure 3A:
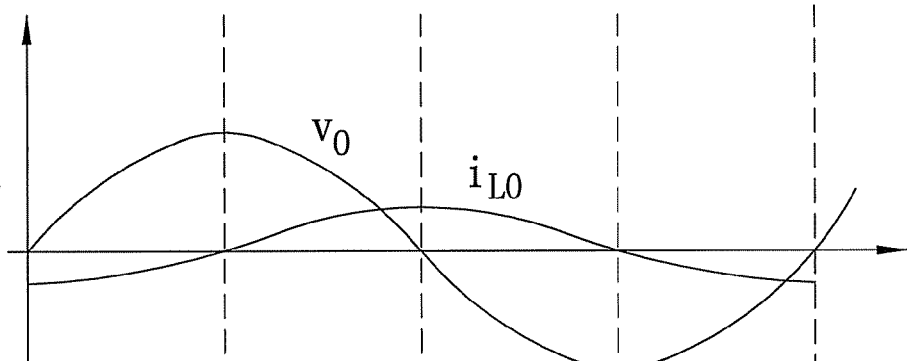
FIG. 3a illustrates waveforms of a voltage ($v_O$) across an output capacitor of the first preferred embodiment, and a current ($i_{LO}$) flowing through an output inductor of the first preferred embodiment.
Figure 3B:
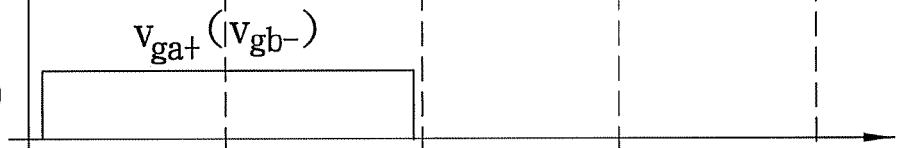
FIG. 3b illustrates a waveform of control signals ($v_{ga+}$, $v_{gb-}$) for first and fourth switches of the first preferred embodiment.
Figure 3C:
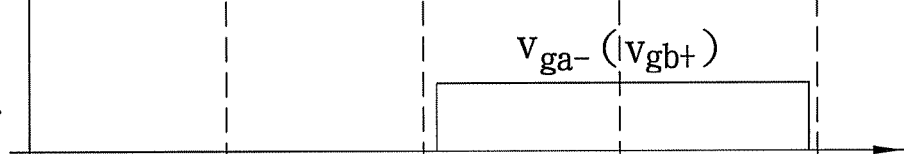
FIG. 3c illustrates a waveform of control signals ($v_{ga-}$, $V_{gb+}$) for second and third switches of the first preferred embodiment.
Figure 3D:
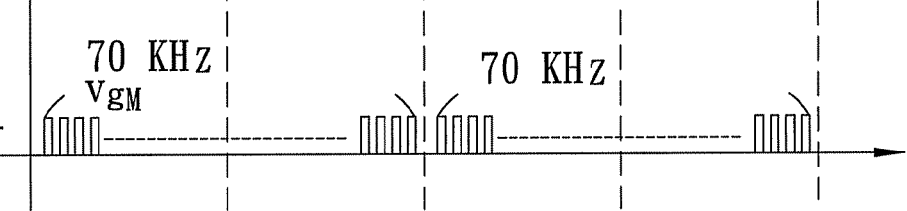

In this embodiment, a control circuit 4 is adapted for providing respectively the control signals ($v_{gM}$, $v_{ga+}$, $v_{ga+}$, $v_{gb+}$, $v_{gb-}$) to the control ends of the clamp switch (Q0), and the first, second, third and fourth switches (Q1, Q2, Q3, Q4). As shown in FIGS. 3b and 3c, each of the control signals ($v_{ga+}$, $v_{ga-}$, $V_{gb+}$, $v_{gb-}$) has a frequency of 60 Hz. As such, each of the first, second, third and fourth switches (Q1, Q2, Q3, Q4) is switched at the frequency of 60 Hz. Moreover, each of the first, second, third and fourth switches (Q1, Q2, Q3, Q4) has a duty cycle that is less than 50%. As shown in FIG. 3d, the control signal ($v_{gM}$) has a frequency of 70 KHz such that the clamp switch (Q0) is switched at the frequency of 70 KHz.

The output circuit 5 includes an output capacitor 51 coupled between a first common node (n1) between the first and second switches (Q1, Q2), and a second common node (n2) between the third and fourth switches (Q3, Q4). As shown in FIG. 3a, the AC voltage output is a voltage ($v_O$) across the output capacitor 51.

When the first and fourth switches (Q1, Q4) are in the ON-state, the output capacitor 51 is charged so that the AC voltage output is a positive half of the sinusoidal signal. When the second and third switches (Q2, Q3) are in the ON-state, the output capacitor 51 is reversely charged so that the AC voltage output, i.e., $v_O$, is a negative half of the sinusoidal signal. Referring to FIGS. 3a, 3b and 3c, each of the first, second, third and fourth switches (Q1, Q2, Q3, Q4) is in the OFF-state during crossover between the positive and negative halves of the sinusoidal signal of the AC voltage output.

In this embodiment, the output circuit 5 further includes an output inductor 52 coupled in parallel to the output capacitor 51. The output inductor 52 is capable of drawing out energy attributed to the output capacitor 51 during crossover between the positive and negative halves of the sinusoidal signal of the AC voltage output.

The power converting device of the first preferred embodiment is operable among first to sixth modes during a cycle of the control signal ($v_{gM}$) for the clamp switch (Q0) shown in FIG. 4a. FIG. 4b illustrates waveforms of currents ($i_{Ld}$, $i_{Lf}$) flowing respectively through the first and second windings (Ld, Lf). FIG. 4c illustrates waveforms of a current ($i_{Q0}$) flowing through the clamp switch (Q0), and a voltage ($v_{Q0}$) across the clamp switch (Q0). FIG. 4d illustrates waveforms of a current ($i_{D1}$) flowing through the clamp diode (D1), and a voltage ($v_{D1}$) across the clamp diode (D1). FIG. 4e illustrates waveforms of a current ($i_{D2}$) flowing through the rectifying diode (D2), and a voltage ($v_{D2}$) across the rectifying diode (D2).

Figure 5:
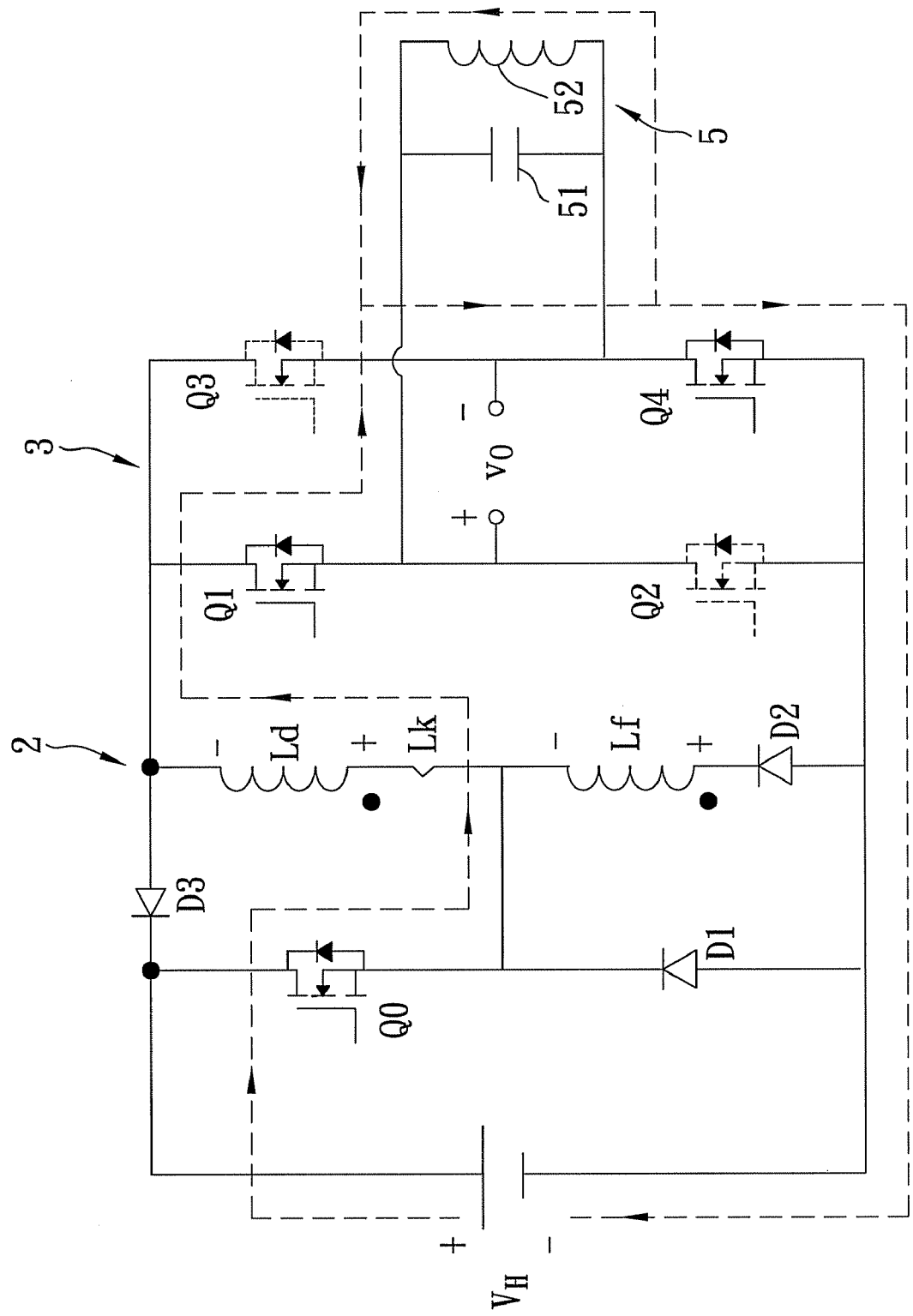
FIG. 5 is a schematic equivalent electrical circuit diagram illustrating the first preferred embodiment when operated in a first mode.
Figure 6:
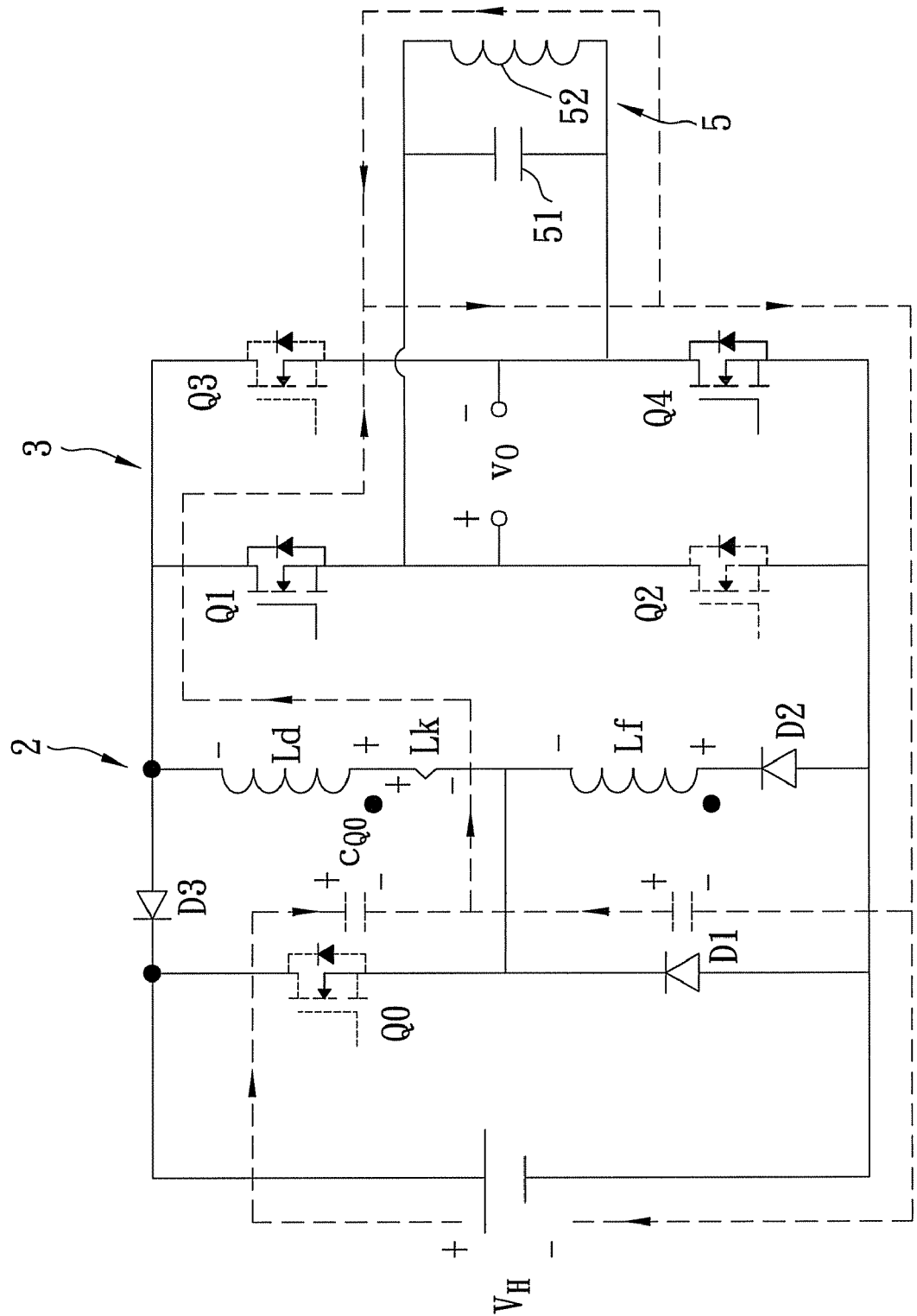
FIG. 6 is a schematic equivalent electrical circuit diagram illustrating the first preferred embodiment when operated in a second mode.
Figure 7:
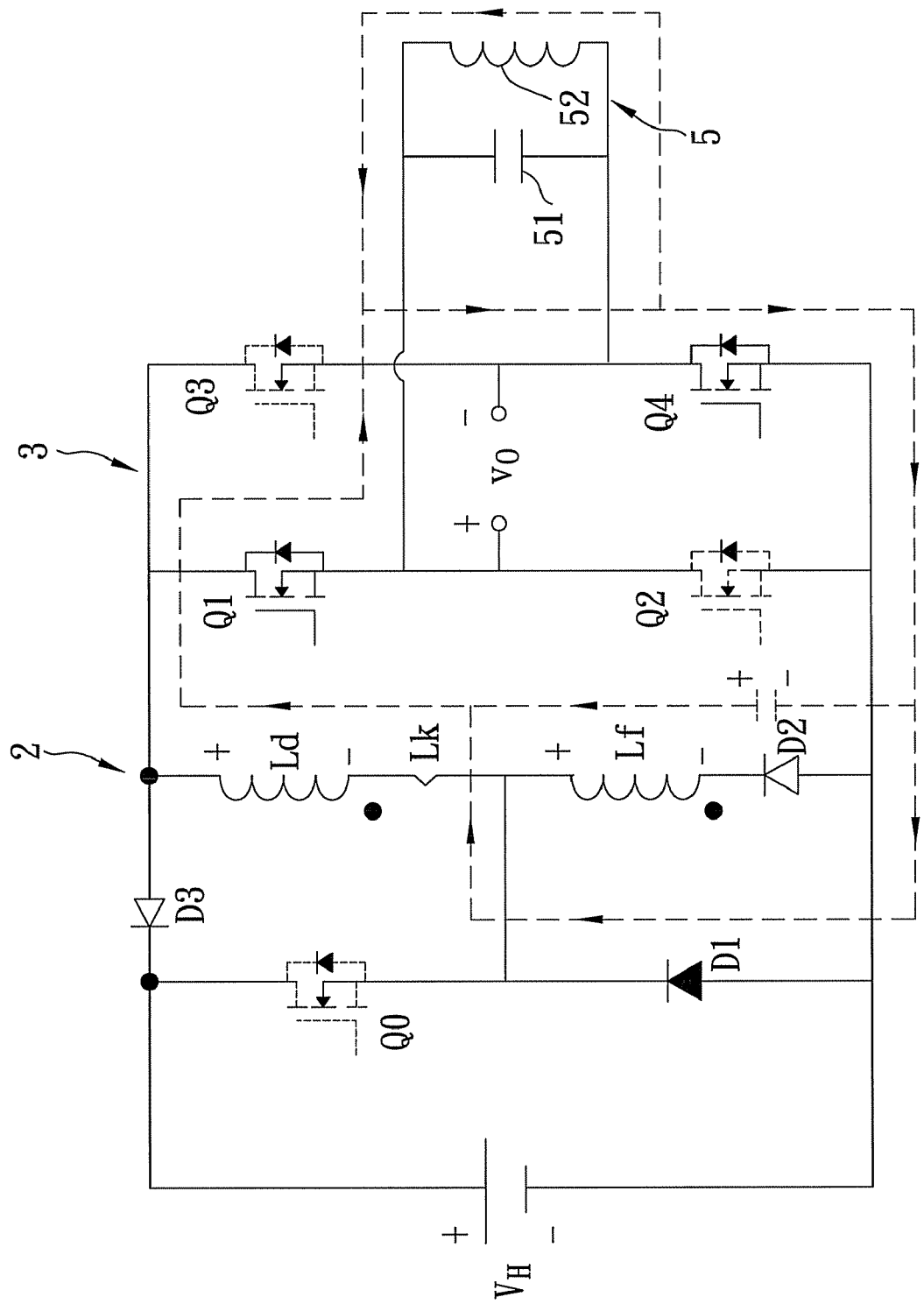
FIG. 7 is a schematic equivalent electrical circuit diagram illustrating the first preferred embodiment when operated in a third mode.
Figure 8:
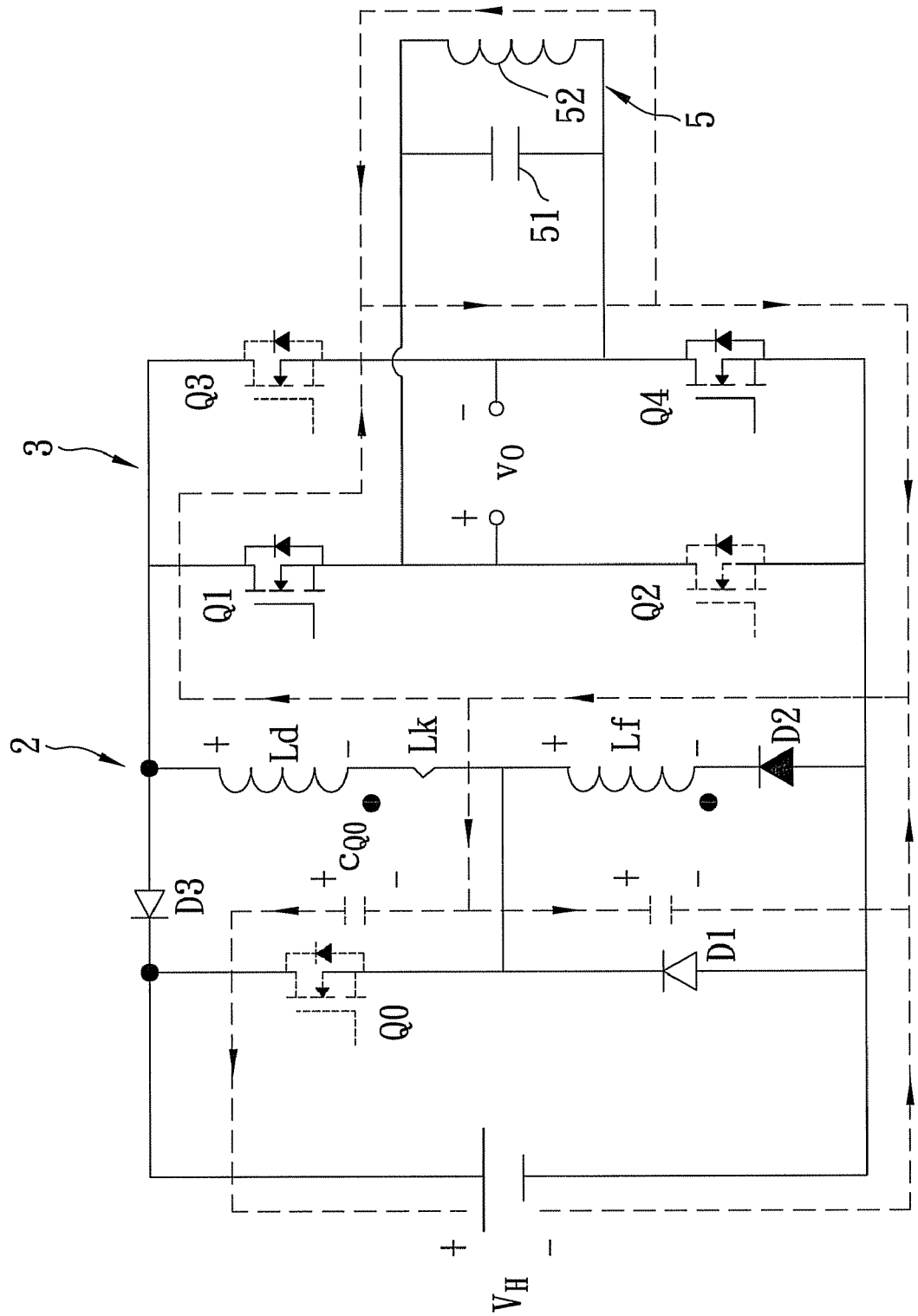
FIG. 8 is a schematic equivalent electrical circuit diagram illustrating the first preferred embodiment when operated in a fourth mode.
Figure 9:
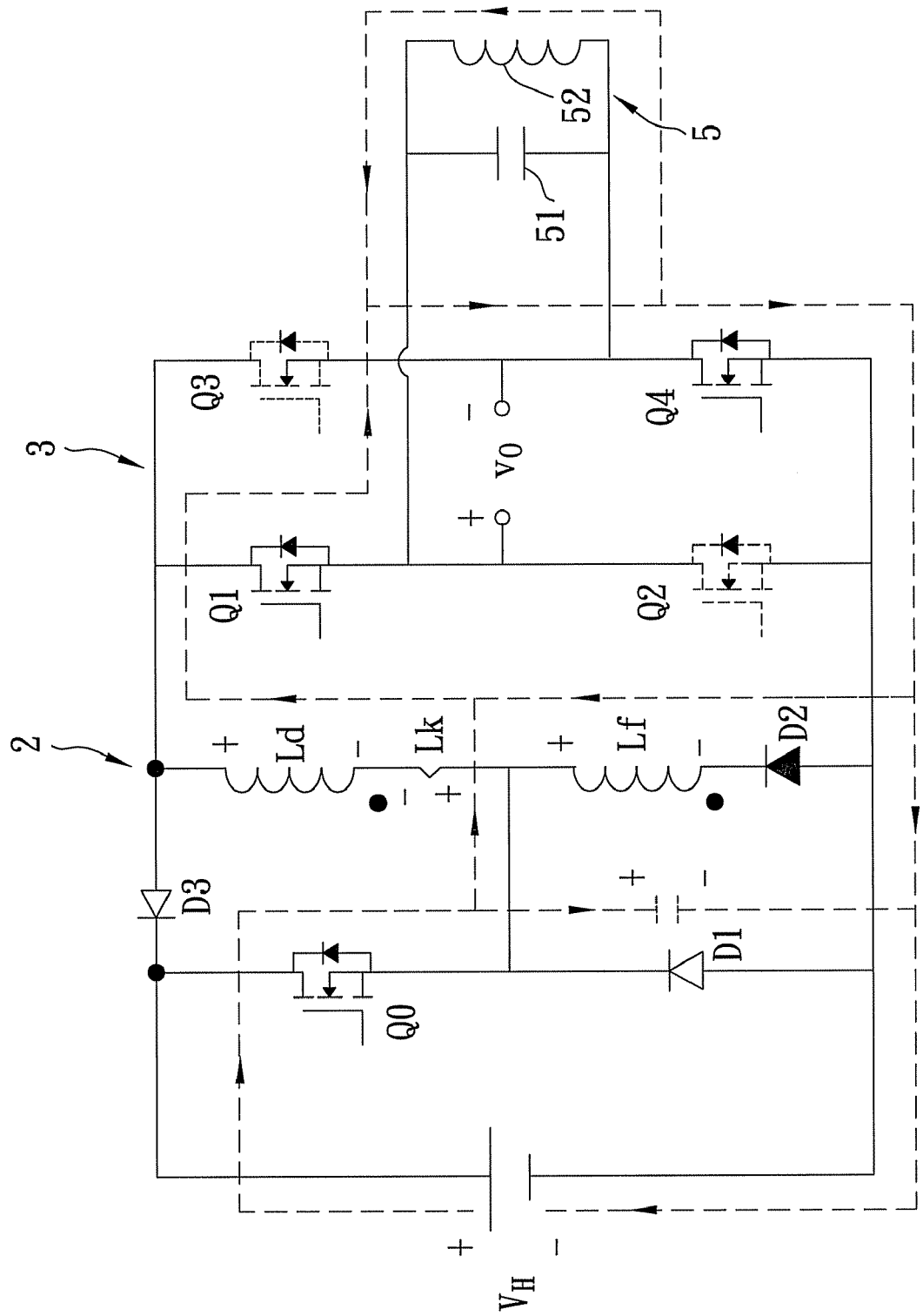
FIG. 9 is a schematic equivalent electrical circuit diagram illustrating the first preferred embodiment when operated in a fifth mode.
Figure 10:
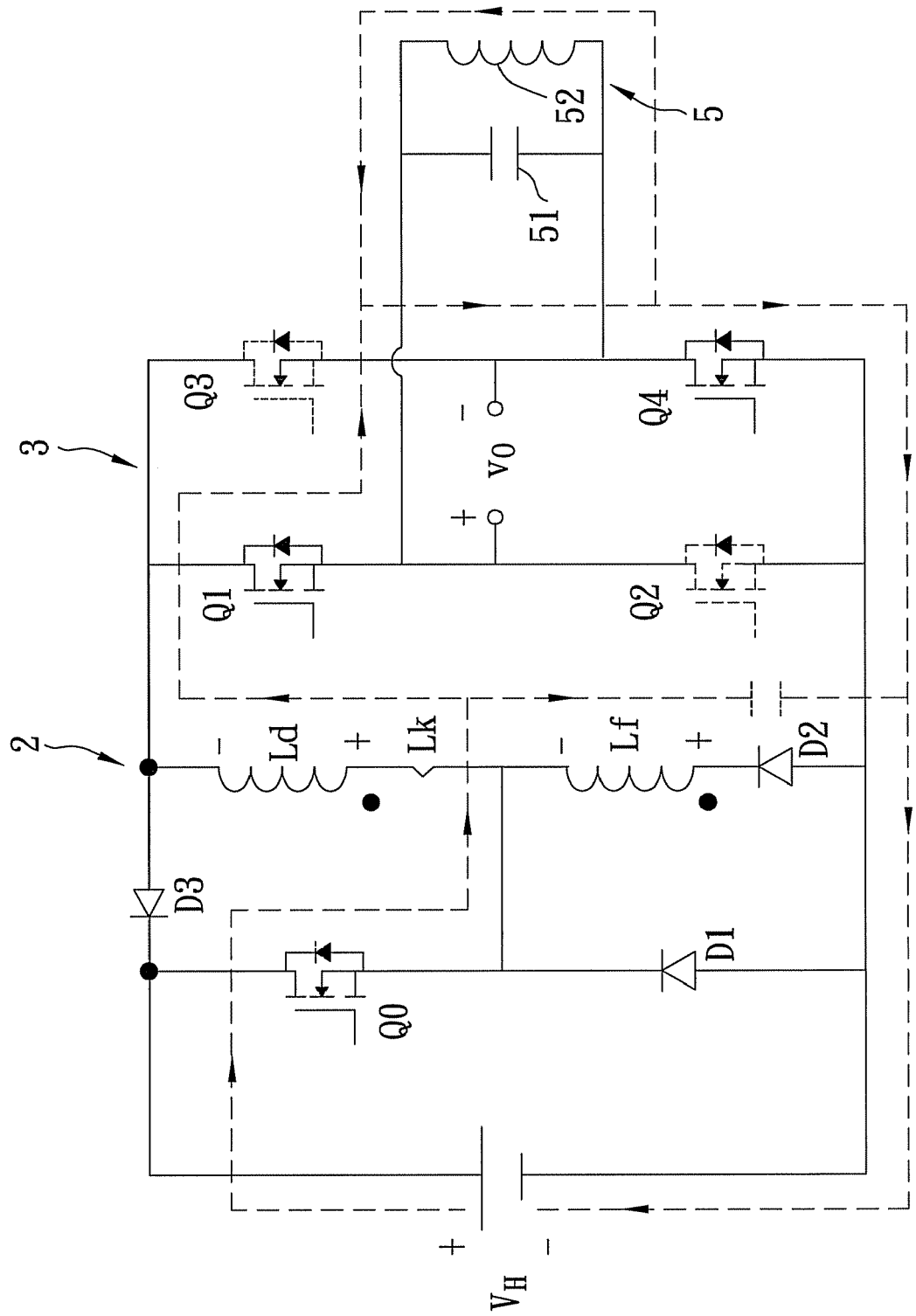
FIG. 10 is a schematic equivalent electrical circuit diagram illustrating the first preferred embodiment when operated in a sixth mode.

Referring further to FIGS. 4a to 4e, and 5, the power converting device is operated in the first mode during a period from $t_0$ to $t_1$. In FIG. 5, Lk represents a leakage inductance of the first winding (Ld). In the first mode, the clamp switch (Q0), and the first and fourth switches (Q1, Q4) are in the ON-state, the second and third switches (Q2, Q3) are in the OFF-state, and the clamp diode (D1), the rectifying diode (D2) and the feedback diode (D3) do not conduct. The first winding (Ld) is excited by a current from the external power source through the clamp switch (Q0). In this case, the output capacitor ($C_O$) is charged through the first and fourth switches (Q1, Q4) by the current ($i_{Ld}$) flowing through the first winding (Ld). Thus, the voltage ($v_{Ld}$) across the first winding (Ld) is represented as follows:

$$v_{Ld}=L_d \cdot di_{Ld}/dt=V_H-v_O \quad \text{(Equation 1)}$$

The voltage ($v_{Q0}$) across the clamp switch (Q0) is zero (see FIG. 4c) such that the voltage ($v_{D1}$) across the clamp diode (D1) is clamped to $V_H$ (see FIG. 4d).

Referring to FIGS. 4a to 4e, and 6, the power converting device is operated in the second mode during a period from $t_1$ to $t_2$. In the second mode, the first and fourth switches (Q1, Q4) are in the ON-state, the clamp switch (Q0), and the second and third switches (Q2, Q3) are in the OFF-state, and the clamp diode (D1), the rectifying diode (D2) and the feedback diode (D3) do not conduct. Energy attributed to the leakage inductance (Lk) of the first winding (Ld) is released such that an induced voltage across the first winding (Ld) is generated. In this case, the output capacitor 51 and a parasitic capacitor ($C_{Q0}$) of the clamp switch (Q0) are charged through the first and fourth switches (Q1, Q4) with the voltage input ($V_H$) and a voltage across the leakage inductance (Lk). On the other hand, the current ($i_{D1}$) flowing through the clamp diode (D1) and generated based on a parasitic capacitance of the clamp diode (D1) flows to the first winding (Ld). Since $v_{Q0}+v_{D1}=V_H$, the clamp switch (Q0) and the clamp diode (D1) clamp each other, and each of the voltages ($v_{Q0}$, $v_{D1}$) across the clamp switch (Q0) and the clamp diode (D1) has a maximum value equal to $V_H$.

Referring to FIGS. 4a to 4e, and 7, the power converting device is operated in the third mode during a period from $t_2$ to $t_3$. In the third mode, the first and fourth switches (Q1, Q4) are in the ON-state, the clamp switch (Q0), and the second and third switches (Q2, Q3) are in the OFF-state, the clamp diode (D1) conducts, and the rectifying diode (D2) and the feedback diode (D3) do not conduct. When energy attributed to the leakage inductance (Lk) of the first winding (Ld) is fully released, the voltage ($v_{Q0}$) across the clamp switch (Q0) is equal to $V_H$ (see FIG. 4c). In this case, the output capacitor 51 is charged through the first and fourth switches (Q1, Q4), and the clamp diode (D1) by the current ($i_{Ld}$) flowing through the first winding (Ld). On the other hand, a parasitic capacitance of the rectifying diode (D2) discharges such that the current ($i_{Ld}$) flowing through the first winding (Ld) is equal to a sum of the current ($i_{D1}$) flowing the clamp diode (D1) and the current ($i_{Lf}$) flowing through the second winding (Lf).

Referring to FIGS. 4a to 4e, and 8, the power converting device is operated in the fourth mode during a period from $t_3$ to $t_4$. In the fourth mode, the first and fourth switches (Q1, Q4) are in the ON-state, the clamp switch (Q0), and the second and third switches (Q2, Q3) are in the OFF-state, the rectifying diode (D2) conducts, and the clamp diode (D1) and the feedback diode (D3) do not conduct. Initially, the current ($i_{Lf}$) flowing through the second winding (Lf) is greater than the current ($i_{Ld}$) flowing through the first winding (Ld) (see FIG. 4b). In this case, the parasitic capacitance of the clamp diode (D1) is charged such that the clamp diode (D1) is reversely biased to cut off. Energy attributed to the parasitic capacitance ($C_{Q0}$) of the clamp switch (Q0) is released to the external power source. Since a voltage across the first and second windings (Ld, Lf) is equal to $v_O$, a voltage ($v_{Lf}$) across the second winding (Lf) is $v_O N/(1+N)$. Since the voltage ($v_{D1}$) across the clamp diode (D1) is equal to a sum of the voltage ($v_{Lf}$) across the second winding (Lf) and the voltage ($v_{D2}$) across the rectifying diode (D2), i.e., $v_{D1}=v_{Lf}+v_{D2}$, and since the voltage input ($V_H$) is equal to a sum of the voltage ($v_{Q0}$)

across the clamp switch (Q0) and the voltage ($v_{D1}$) across the clamp diode (D1), i.e., $V_H = v_{Q0} + v_{D1}$, the voltage ($v_{Q0}$) across the clamp switch (Q0) is represented as follows:

$$v_{Q0} = V_H - v_{D1} = V_H - v_O N/(1+N) \quad \text{(Equation 2)}$$

Thereafter, the current ($i_{Lf}$) flowing the second winding (Lf) decreases (see FIG. 4b). Thus, the output capacitor 51 is charged through the first and fourth switches (Q1, Q4) with the voltage across the first and second windings (Ld, Lf) that is represented as follows:

$$L_d \cdot (1+N)^2 \cdot di_{Ld}/dt = -v_O \quad \text{(Equation 3)}$$

Referring to FIGS. 4a to 4e, and 9, the power converting device is operated in the fifth mode during a period from $t_4$ to $t_5$. In the fifth mode, the clamp switch (Q0), and the first and fourth switches (Q1, Q4) are in the ON-state, the second and third switches (Q2, Q3) are in the OFF-state, the rectifying diode (D2) conducts, and the clamp diode (D1) and the feed back diode (D3) do not conduct. Since the clamp diode (D1) is cut-off, a reverse recovery current is very small even though the voltage ($v_{D1}$) across the clamp diode (D1) rises once again to $V_H$. Due to the leakage inductance of the first winding (Ld), the clamp switch (Q0) cannot draw any current from the first and second windings (Ld, Lf) when the clamp switch (Q0) is switched from the OFF-state to the ON-state. Thus, the clamp switch (Q0) has zero-current switching characteristics during transformation from the OFF-state to the ON-state. On the other hand, the current ($i_{Q0}$) flowing through the clamp switch (Q0) is divided into to two current portions, wherein the parasitic capacitance of the clamp diode (D1) is fully charged by one current portion, and the other current portion flows to the first winding (Ld). The output capacitor 51 is charged through the first and fourth switches (Q1, Q4) by a sum of the other current portion of the current ($i_{Q0}$) flowing through the clamp switch (Q0) and the current ($i_{Lf}$) flowing through the second winding (Lf). It is noted that the current ($i_{Ld}$) flowing through the first winding (Ld) increases and the current ($i_{Lf}$) flowing through the second winding (Lf) reduces to zero at $t_5$, as shown in FIG. 4b.

Referring to FIGS. 4a to 4e, and 10, the power converting device is operated in the sixth mode during a period from $t_5$ to $t_6$. In the sixth mode, the clamp switch (Q0), and the first and fourth switches (Q1, Q4) are in the ON-state, the second and third switches (Q2, Q3) are in the OFF-state, and the rectifying diode (D2), the clamp diode (D1) and the feedback diode (D3) do not conduct. The first winding (Ld) is excited by a current from the external power source through the clamp switch (Q0). The output capacitor 51 is charged through the first and fourth switches (Q1, Q4) by the current ($i_{Ld}$) flowing through the first winding (Ld). At the same time, another current from the external power source through the clamp switch (Q0) serves as a reverse recovery current for the rectifying diode (D2). In this case, the voltage ($v_{D2}$) across the rectifying diode (D2) has a maximum value (see FIG. 4e), and is represented as follows:

$$v_{D2} = V_H(1+N) + v_O \cdot N \quad \text{(Equation 4)}$$

When the current ($i_{Ld}$) continuously increases, the power converting device will be switched from the sixth mode back to the first mode.

If the power converting device is coupled to a small load, the current ($i_{Lf}$) flowing through the second winding (Lf) reduces to zero before the clamp switch (Q0) is switched from the OFF-state to the ON-state, which is regarded as discontinue current mode (DCM) operation. Energy attributed to the coupling circuit 2 is zero such that the clamp switch (Q0) has zero-current switching characteristics. The DCM operation can be divided into first and second operation sections by the ON-state of the clamp switch (Q0). The first operation section is presented in the fourth mode near $t_4$. The second operation section is presented in the fifth mode.

During the first operation section, the parasitic capacitances of the clamp diode (D1) and the rectifying diode (D2) are charged through the full-bridge circuit 3 with the voltage ($v_O$) across the output capacitor 51. When the voltage ($v_{D1}$) across the clamp diode (D1) is equal to $v_O$, the voltages ($v_{Ld}$, $v_{Lf}$) across the first and second windings (Ld, Lf) are both zero. Thus, the voltage ($v_{D2}$) across the rectifying diode (D2) is equal to $v_O$. In this case, the voltage ($v_{Q0}$) across the clamp switch (Q0) can be represented as follows:

$$v_{Q0} = V_H - v_{D1} = V_H - v_O \quad \text{(Equation 5)}$$

Referring to Equations 2 and 5, the voltage ($V_{Q0}$) across the clamp switch (Q0) is held until the clamp switch (Q0) is switched from the OFF-state to the ON-state, and thereafter varies with the voltage ($v_O$) across the output capacitor 51. The higher the voltage ($v_O$) across the output capacitor 51, the lower will be the voltage ($v_{Q0}$) across the clamp switch (Q0). Energy ($w_{Q0}$) attributed to the parasitic capacitance ($C_{Q0}$) of the clamp switch (Q0) is represented as follows:

$$w_{Q0} = \tfrac{1}{2} \cdot C_{Q0} \cdot v_{Q0}^2 \quad \text{(Equation 6)}$$

Therefore, switching loss of the clamp switch (Q0) can be greatly reduced by reducing the voltage across the parasitic capacitance ($C_{Q0}$) of the clamp switch (Q0). As such, the power converting device has a lower switching loss when in the DCM operation. Using Equations 1 and 3, a gain ratio ($G_v$) of the power converting device is determined according to the following Equation 7:

$$G_V = |v_O|/V_H = d + Nd/(1+Nd) \quad \text{(Equation 7)}$$

where d is a duty cycle of the clamp switch (Q0).

When the first and fourth switches (Q1, Q4) are in the OFF-state, and the second and third switches (Q2, Q3) are in the ON-state, the output capacitor 51 is reversely charged so that the voltage ($v_O$) across the output capacitor 51 is the negative half of the sinusoidal signal. In this case, operations of the clamp switch (Q0) are similar to the aforesaid operations, and will not be described further.

In this embodiment, the output inductor 52 cooperates with the output capacitor 51 to form a second-order parallel resonant configuration. A current ($i_{LO}$) flowing through the output inductor 52 has an electrical angle which falls behind that of the voltage ($v_O$) across the output capacitor 51 by about 90°. As a result, when the voltage ($v_O$) across the output capacitor 51 is nearly zero, the current ($i_{LO}$) flowing through the output inductor 52 has a maximum value, as shown in FIG. 3a. Therefore, the output inductor 52 is capable of drawing out energy attributed to the output capacitor 51 during crossover between the positive and negative halves of the sinusoidal signal of the AC voltage output, thereby attaining zero-crossover.

Since energy transferring between the output capacitor 51 and the output inductor 52 does not pass through the full-bridge circuit 3, each of the first, second, third and fourth switches (Q1, Q2, Q3, Q4) is not triggered during crossover between the positive and negative halves of the sinusoidal signal of the AC voltage output. A loop current is limited in a shortest path such that a short circuit current does not occur when any one of the first, second, third and fourth switches (Q1, Q2, Q3, Q4) is switched from the OFF-state to the ON-state. Therefore, diodes in the aforesaid conventional power converting device serving as current source inverters can be omitted. A resonant frequency of the output capacitor 51 and the output inductor 52 is represented as follows:

$$f_O = 1/(2\pi\sqrt{L_O C_O}) \quad \text{(Equation 8)}$$

where $L_O$ is a capacitance of the output capacitor 51, and $C_O$ is an inductance of the output inductor 52. Preferably, the resonant frequency is 60 Hz, which is the same as the frequency of a commercial power source, to reduce crossover distortion, to improve resonant stability and to decrease conduction currents of the first, second, third and fourth switches (Q1, Q2, Q3, Q4).

An external load (not shown) is adapted to be coupled in parallel to the output inductor 52 to receive the AC voltage output, i.e., $v_O$. When the external load is a highly inductive load, the resonant frequency of the output circuit 5 changes. When a peak value of the voltage ($v_O$) across the output capacitor 51 is greater than the DC voltage input ($V_H$), the feedback diode (D3) conducts such that energy is fed back to the external power source. Therefore, all the voltages across the switches (Q0, Q1, Q2, Q3, Q4) are clamped, and all components in the power converting device are protected. In this case, a voltage ($v_{D3}$) across the feedback diode (D3) is represented as follows:

$$v_{D3} = V_H - v_O \quad \text{(Equation 9)}$$

Figure 11:
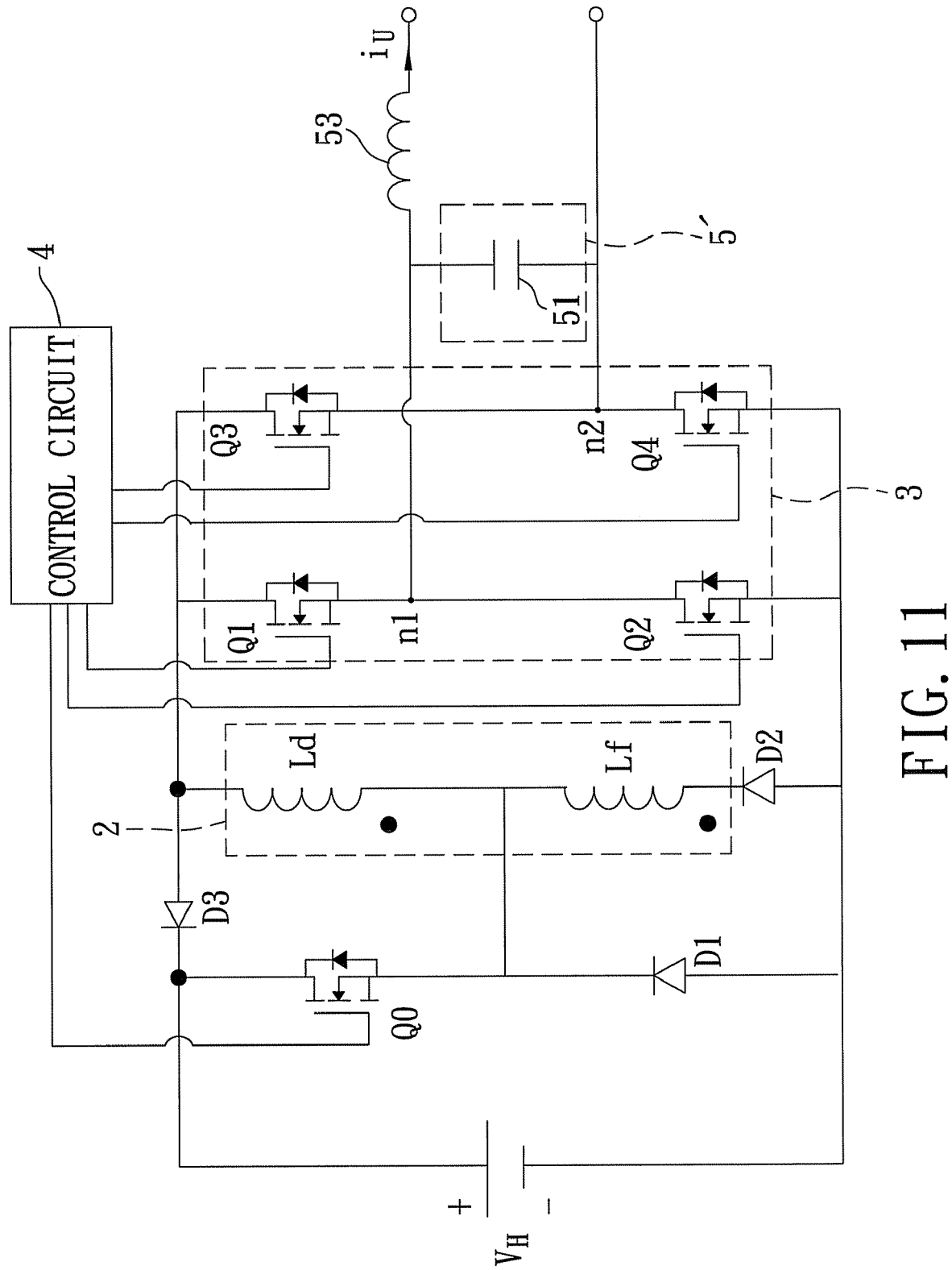
FIG. 11 is a schematic electrical circuit diagram illustrating the second preferred embodiment of a power converting device according to the present invention.

FIG. 11 illustrates the second preferred embodiment of a power converting device according to this invention, which is a modification of the first preferred embodiment. In this embodiment, the output circuit 5' includes merely the output capacitor 51. The power converting device further includes a filter inductor 53 adapted to be coupled between the first common node (n1) and a commercial power source (not shown). A current ($i_{Lf}$) flowing through the filter inductor 53 flows to the commercial power source.

FIGS. 12 to 25 illustrate experimental measurement results when the power converting device of the first preferred embodiment is operated under the DC voltage input ($V_H$) of 170V.

Figure 12:
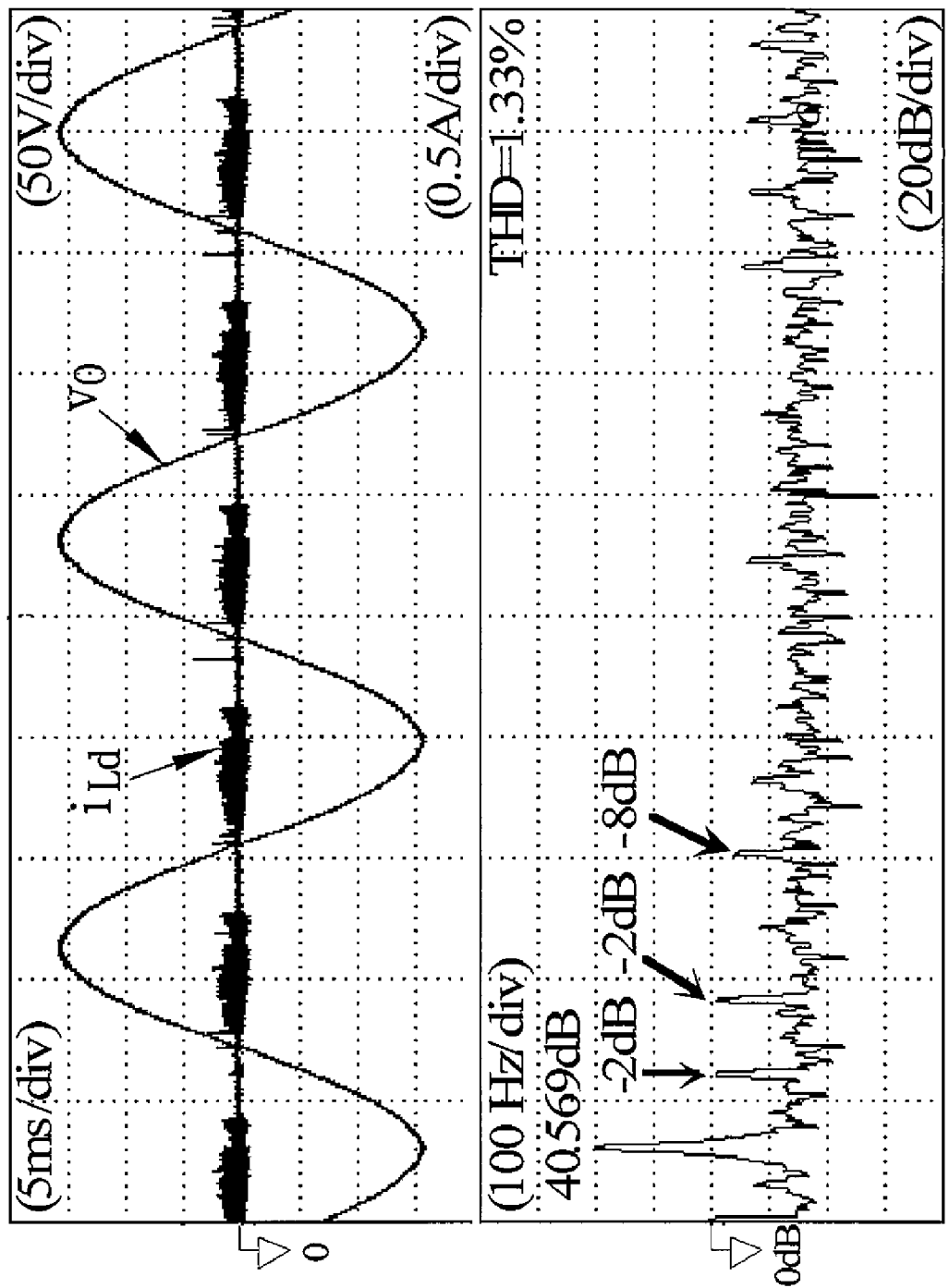
FIG. 12 is a plot illustrating experimental measurement results of the current ($i_{Ld}$) flowing through the first winding, the voltage ($v_O$) across the output capacitor, and Fourier frequency analysis of the voltage ($v_O$) when the first preferred embodiment is under no-load conditions.

As shown in an upper portion of FIG. 12, when the power converting device is not coupled to a load, the current ($i_{Ld}$) flowing through the first winding (Ld) is nearly zero when the voltage ($v_O$) across the output capacitor 51 is near zero. As such, the power converting device of the present invention has extremely small energy loss. In this case, as shown in a lower portion of FIG. 12, total harmonic distortion (THD) of the voltage ($v_O$) is 1.33%.

Figure 13:
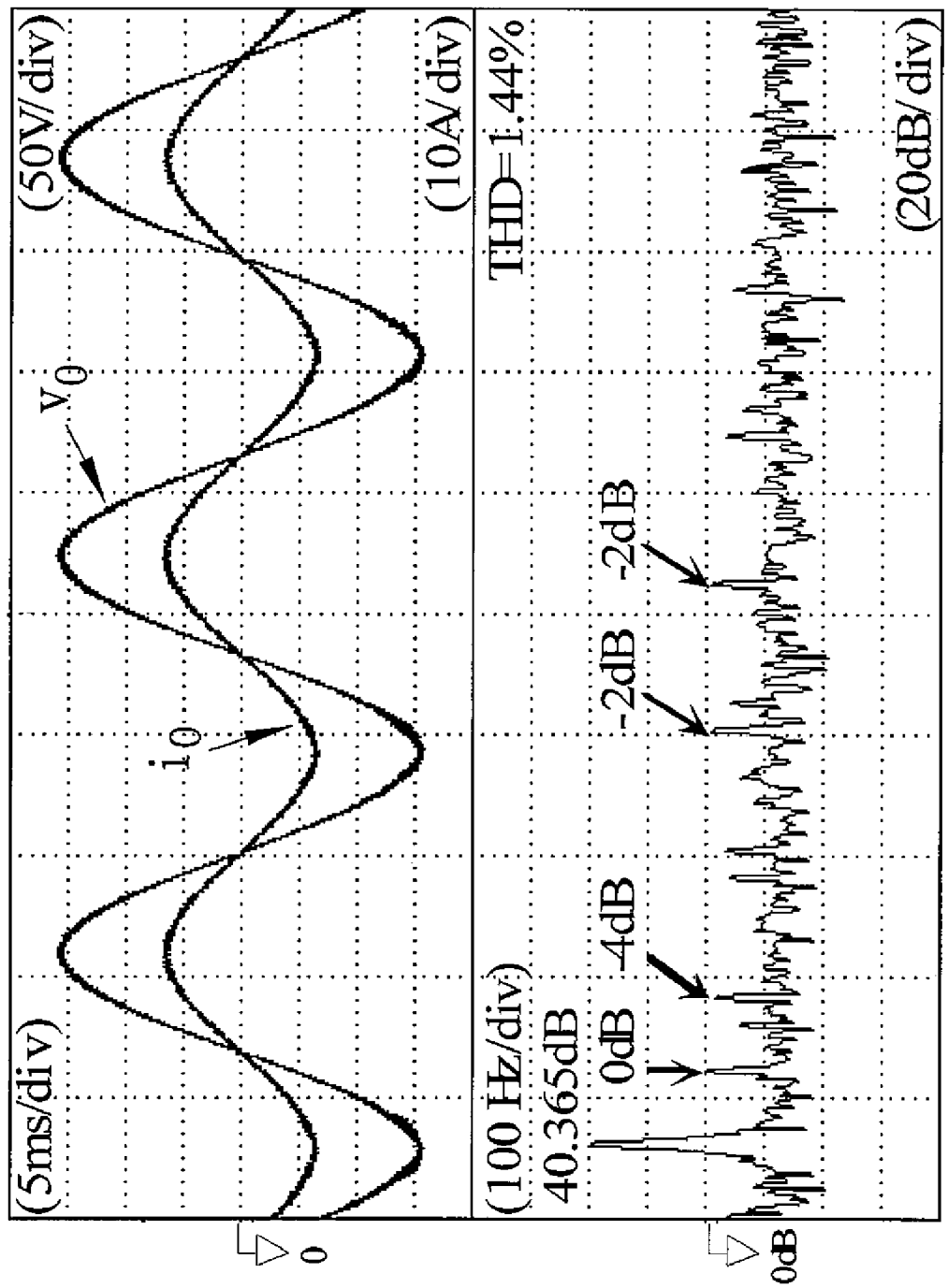
FIG. 13 is a plot illustrating experimental measurement results of the current ($i_O$) flowing through the output capacitor, the voltage ($v_O$) across the output capacitor, and Fourier frequency analysis of the voltage ($v_O$) when the first preferred embodiment supplies a resistive load with an output power of 1 KW.

As shown in FIG. 13, when the power converting device supplies a resistive load with an output power of 1 KW, THD of the voltage ($v_O$) is 1.44%.

Figure 14:
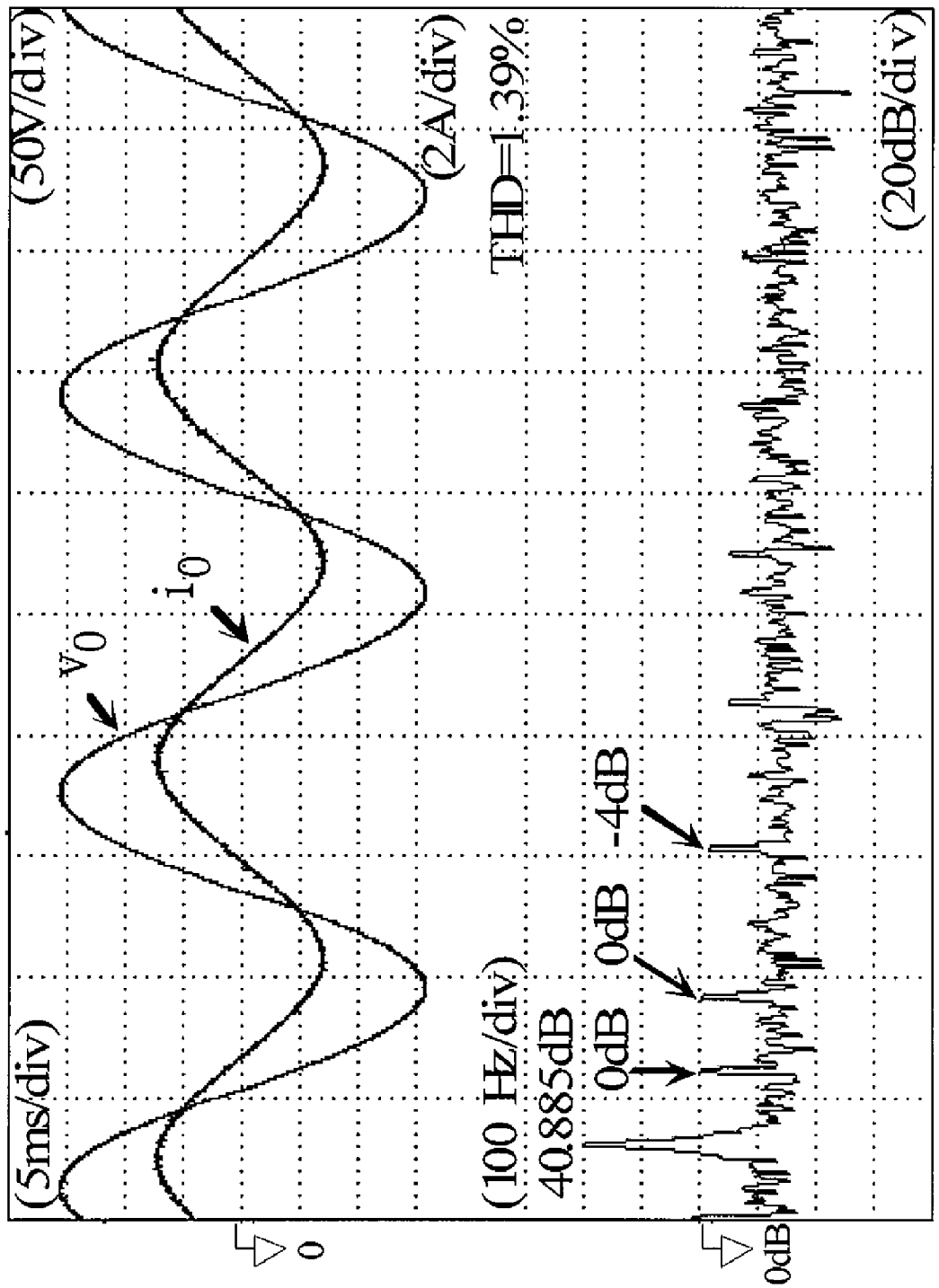
FIG. 14 is a plot illustrating experimental measurement result of the current ($i_O$) flowing though the output capacitor, the voltage ($v_O$) across the output capacitor, and Fourier frequency analysis of the voltage ($v_O$) when the first preferred embodiment is connected to a capacitive load.

As shown in FIG. 14, when the power converting device is coupled to an inductive load, the resonant frequency of the output circuit 5 changes due to the inductive load. In this case, power required for the inductive load can be sufficiently supplied by increasing the capacitance of the output capacitor 51. As such, THD of the voltage ($v_O$) can still be maintained to 1.39%.

Figure 15:
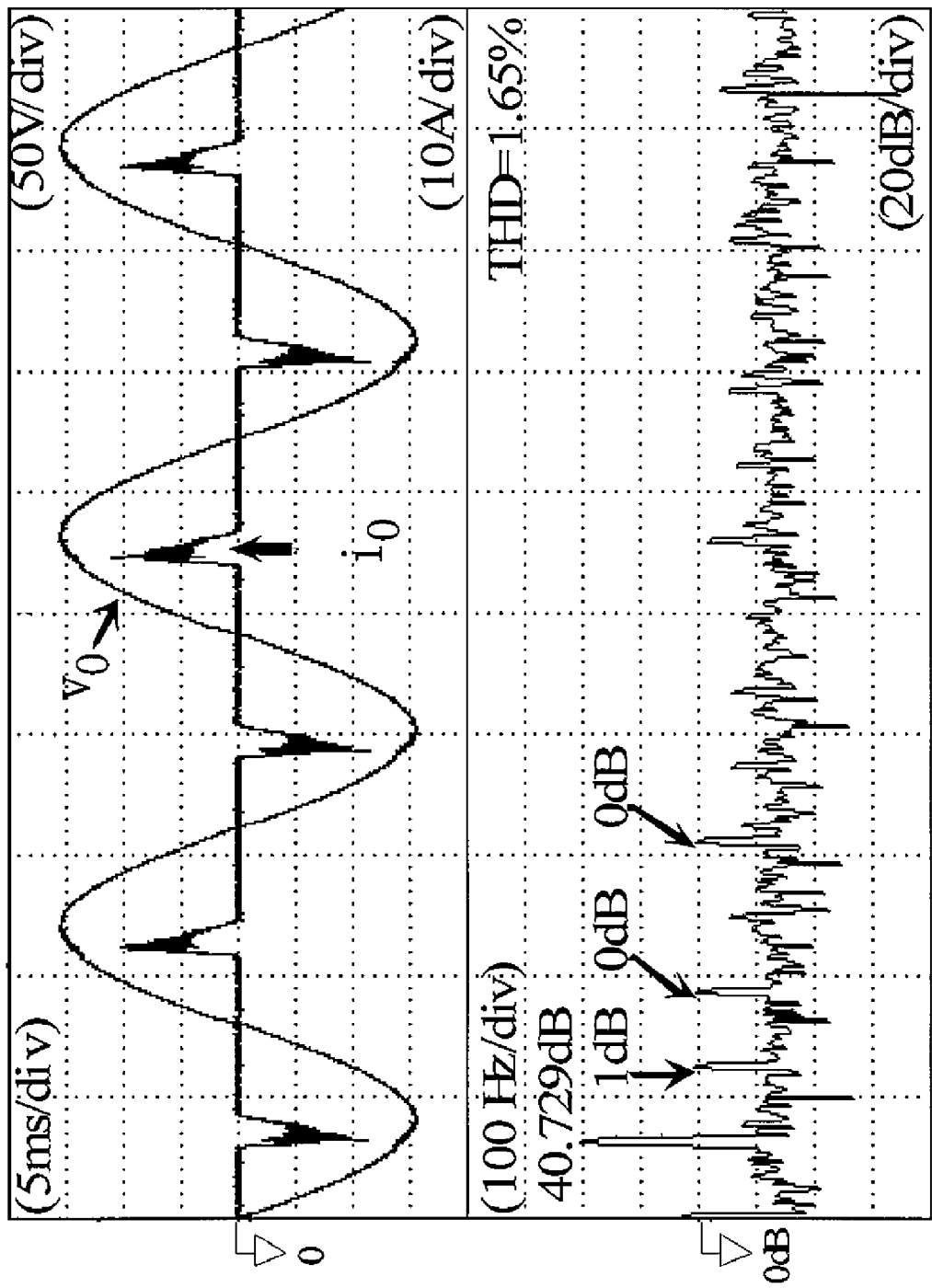
FIG. 15 is a plot illustrating experimental measurement results of the current ($i_O$) flowing through the output capacitor, the voltage ($v_O$) across the output capacitor, and Fourier frequency analysis of the voltage ($v_O$) when the first preferred embodiment is connected to a combination of resistive and capacitive loads.

As shown in FIG. 15, when the power converting device is coupled to a non-linear load, such as a combination of a resistor and a capacitor, regardless of distortion in a left portion of the waveform of the voltage ($v_O$), THD of the voltage ($v_O$) can still be maintained to 1.65%.

Figure 16:
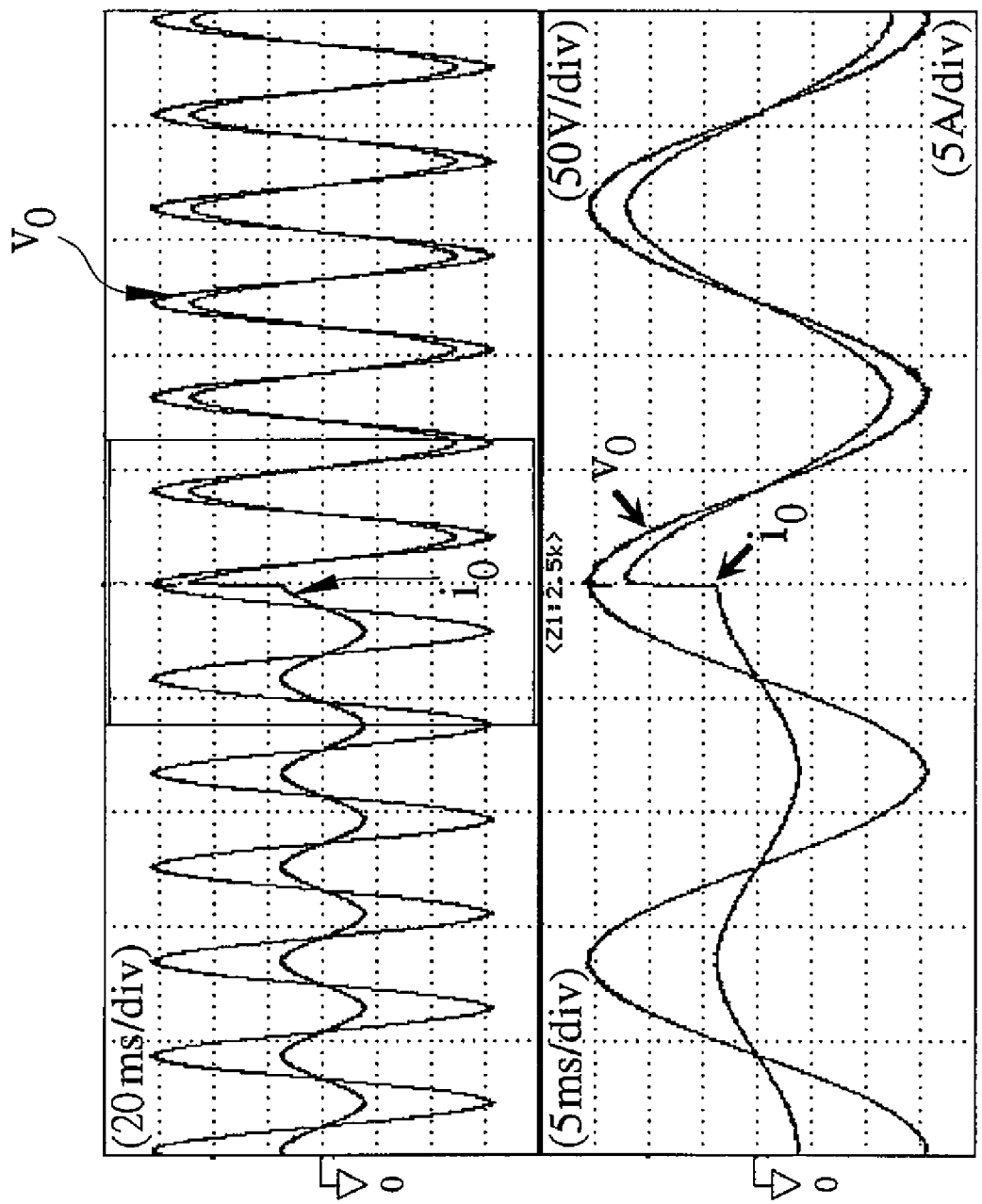
FIG. 16 is a plot illustrating experimental measurement results of the current ($i_O$) flowing through the output capacitor and the voltage ($v_O$) across the output capacitor when an output power of the first preferred embodiment varies from 300 W to 950 W.

As shown in FIG. 16, when the power converting device is coupled to a variable load, the waveform of the voltage ($v_O$) has slight distortion at a peak value during variation of the output power of the power converting device from 300 W to 950 W.

Figure 17:
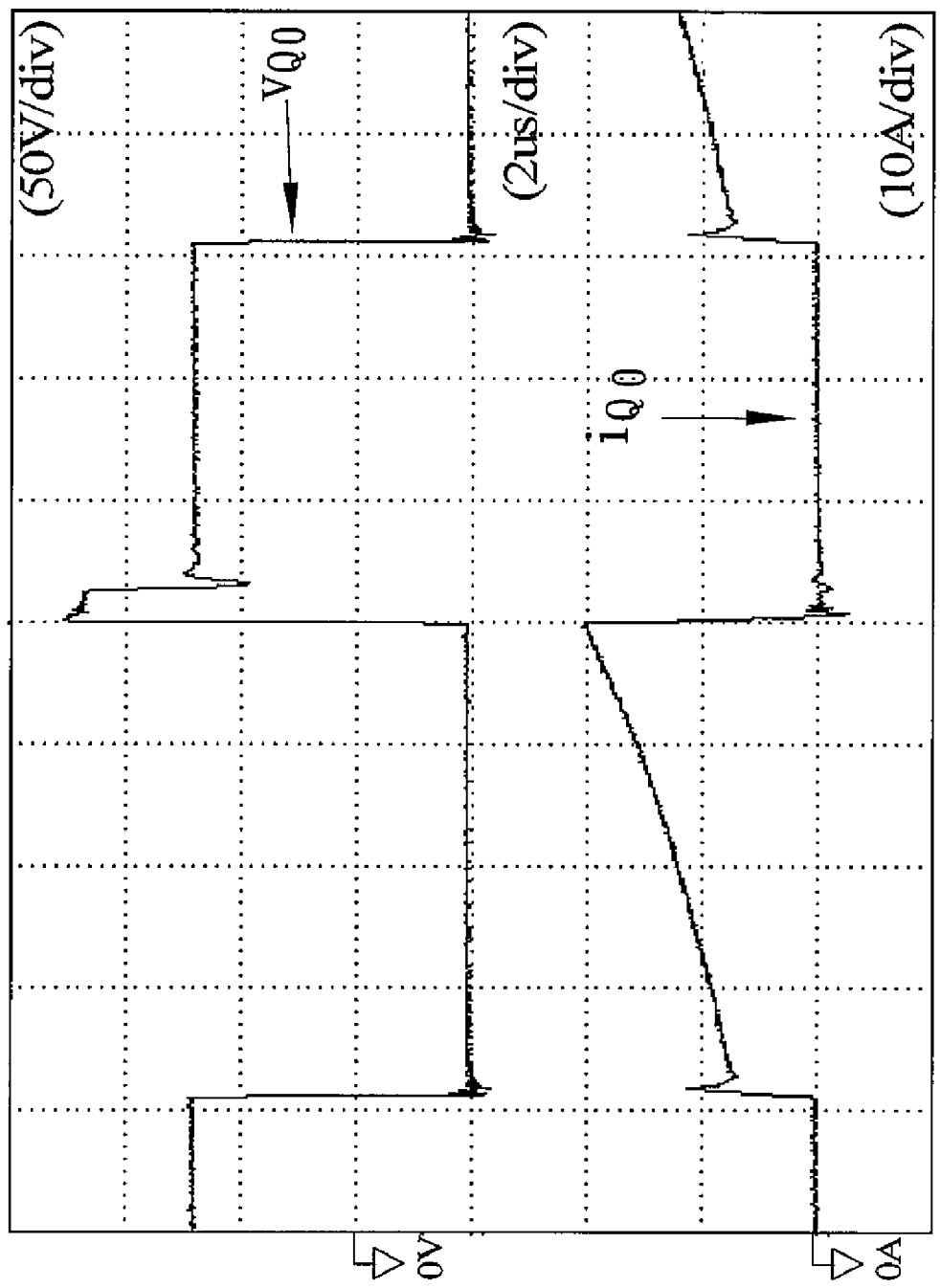
FIGS. 17 and 18 are plots illustrating experimental measurement results of the current ($i_{Q0}$) flowing through the clamp switch, and the voltage ($v_{Q0}$) across the clamp switch when the clamp switch is switched at a frequency of 70 KHz.
Figure 18:
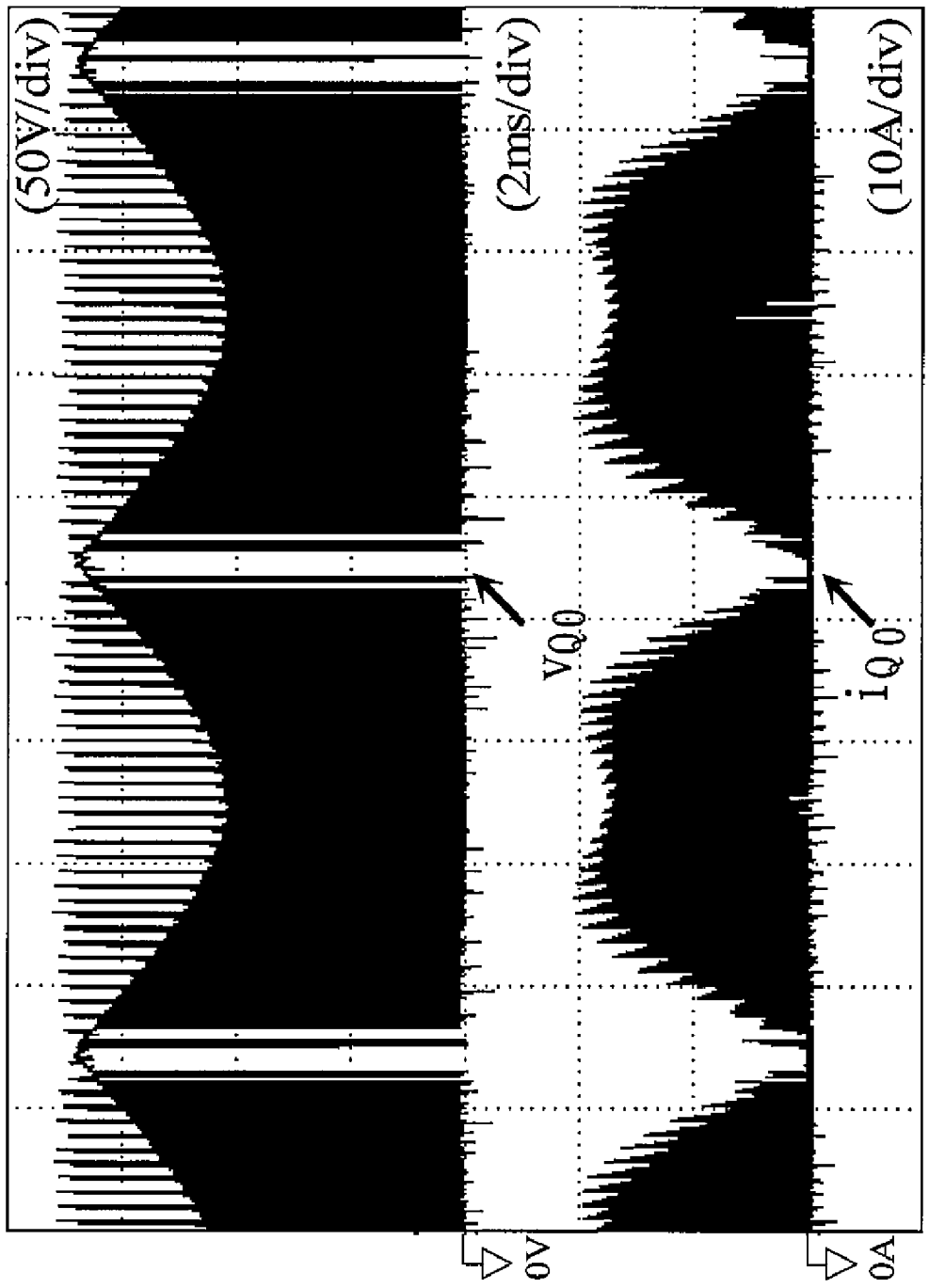

As shown in FIGS. 17 and 18, when the output power of the power converting device is 1 KW, the clamp switch (Q0) has zero-voltage switching characteristics, and the voltage ($V_{Q0}$) across the clamp switch (Q0) is clamped when in the OFF-state. The voltage ($v_O$) across the clamp switch (Q0) is clamped under the DC voltage input ($V_H$) (see FIG. 17), and the current ($i_{Q0}$) is zero during crossover between the positive and negative halves of the sinusoidal signal of the AC voltage output (see FIG. 18).

Figure 19:
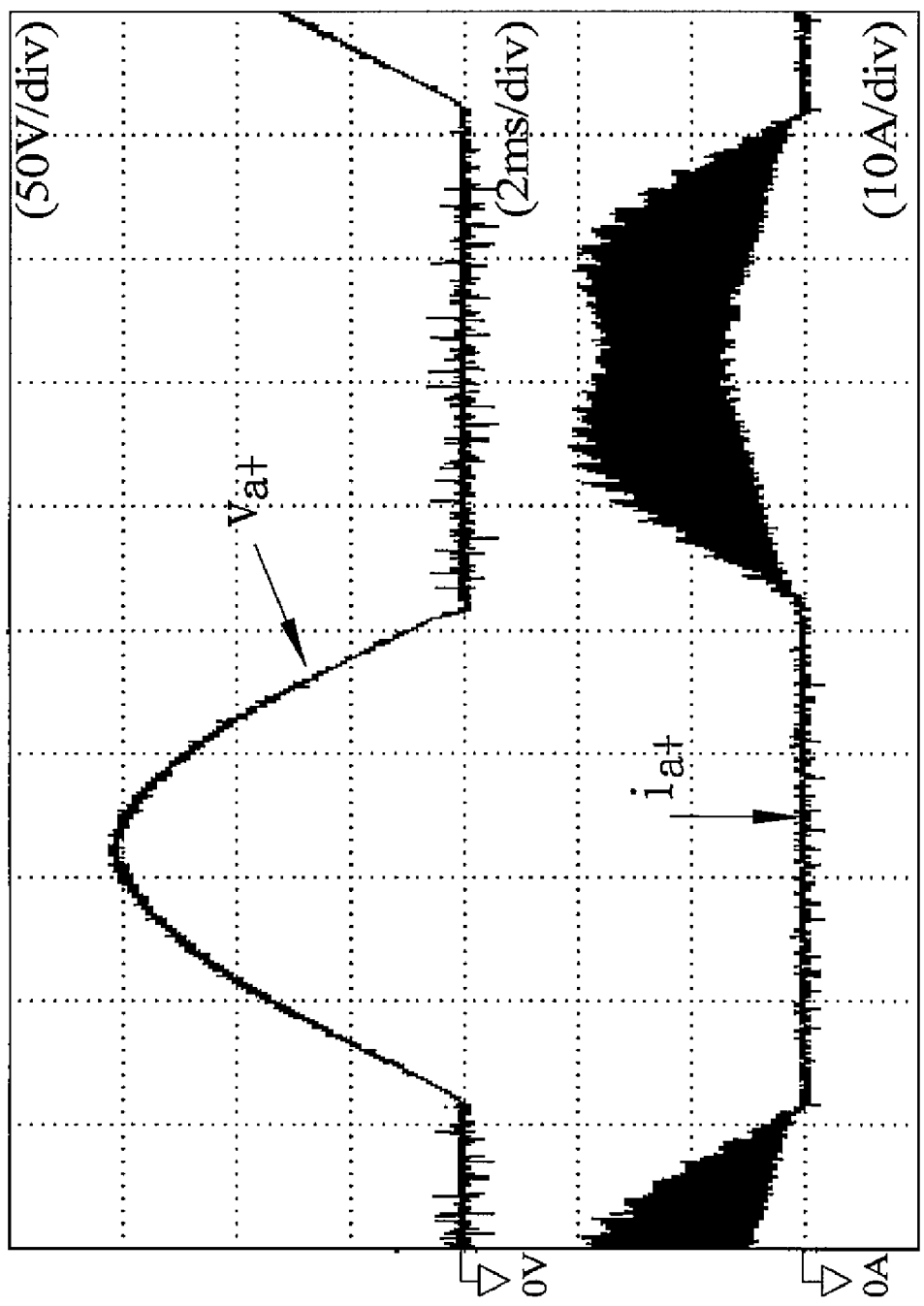
FIG. 19 is a plot illustrating experimental measurement results of a current ($i_{a+}$) flowing through a first switch of a full-bridge circuit of the first preferred embodiment, and a voltage ($v_{a+}$) across the first switch.

As shown in FIG. 19, when the first switch (Q1) is in the ON-state, a voltage ($v_{a+}$) across the first switch (Q1) is zero such that the first switch (Q1) has no switching loss. Furthermore, the first switch (Q1) has zero-voltage and zero-current switching characteristics, and the same voltage endurance specification as the voltage ($v_O$). Similarly, the second, third and fourth switches (Q2, Q3, Q4) have the same characteristics as those of the first switch (Q1).

Figure 20:
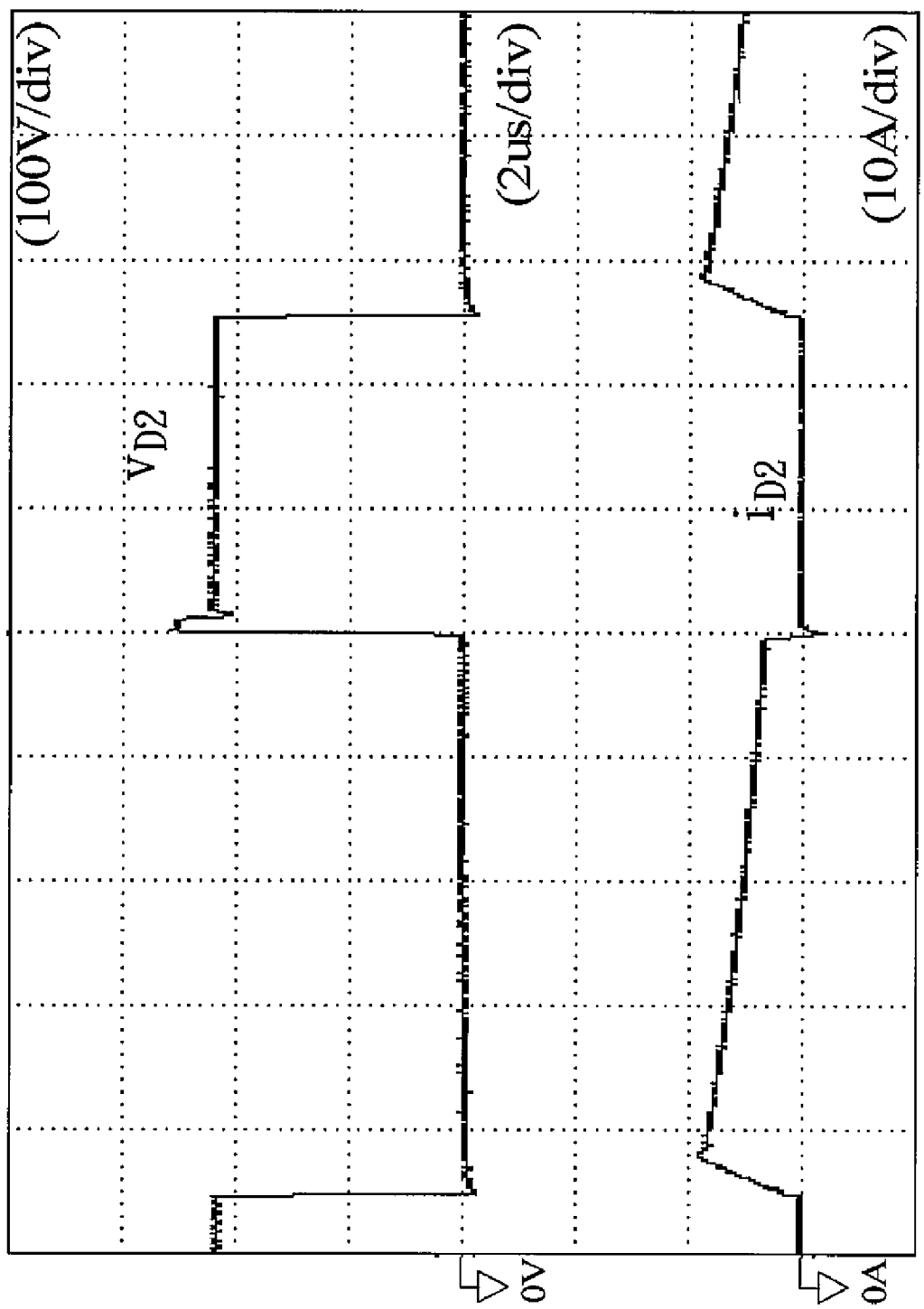
FIG. 20 is a plot illustrating experimental measurement results of the current ($i_{D2}$) flowing through the rectifying diode, and the voltage ($V_{D2}$) across the rectifying diode.

As shown in FIG. 20, the rectifying diode (D2) has low-current switching characteristics when conducting, and has an extremely small reverse recovery current when cut-off. Thus, the rectifying diode (D2) has a relatively low voltage endurance specification.

Figure 21:
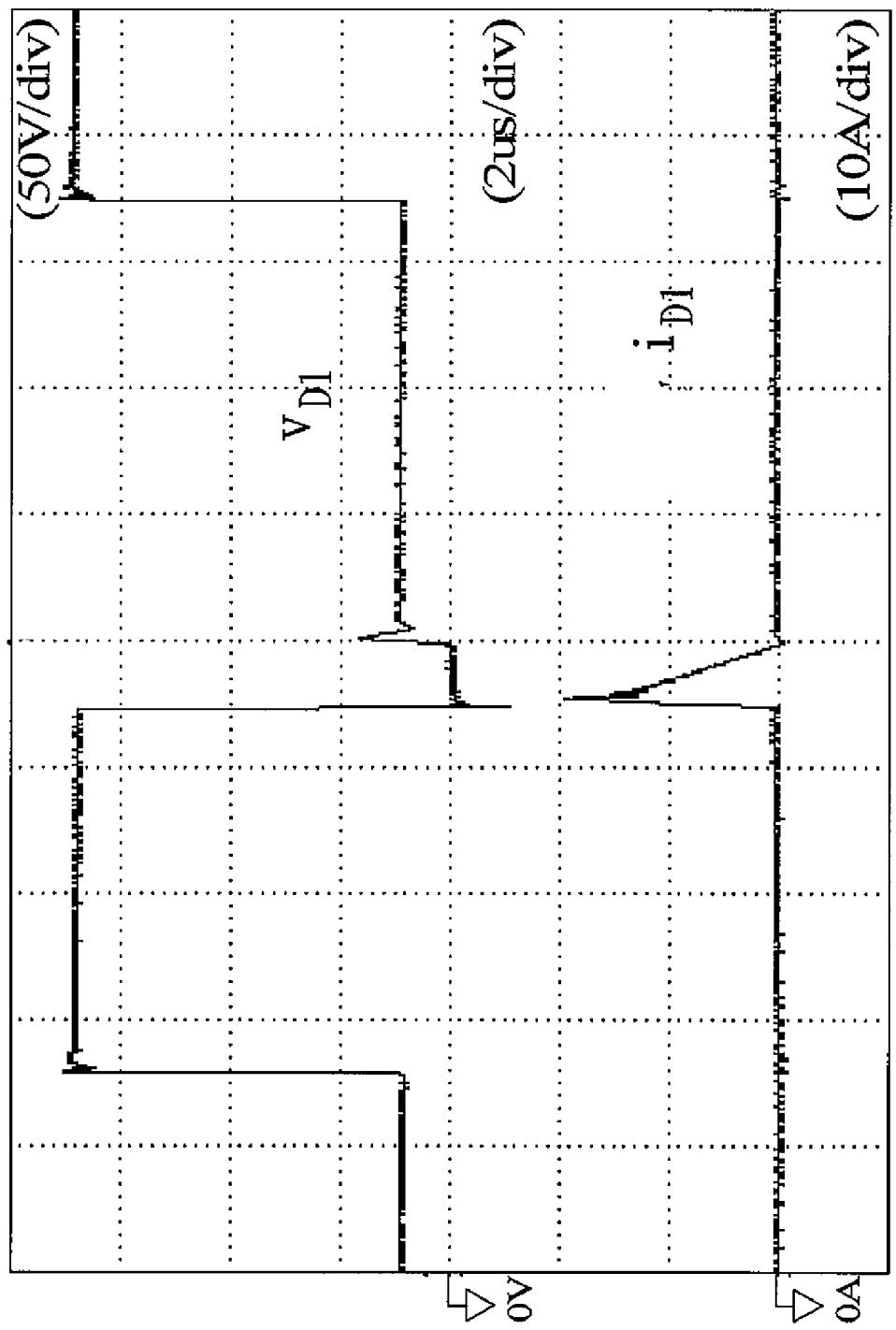
FIGS. 21 and 22 are plots illustrating experimental measurement results of the current ($i_{D1}$) flowing through the clamp diode, and the voltage ($v_{D1}$) across the clamp diode when the clamp switch is switched at a frequency of 70 KHz.
Figure 22:
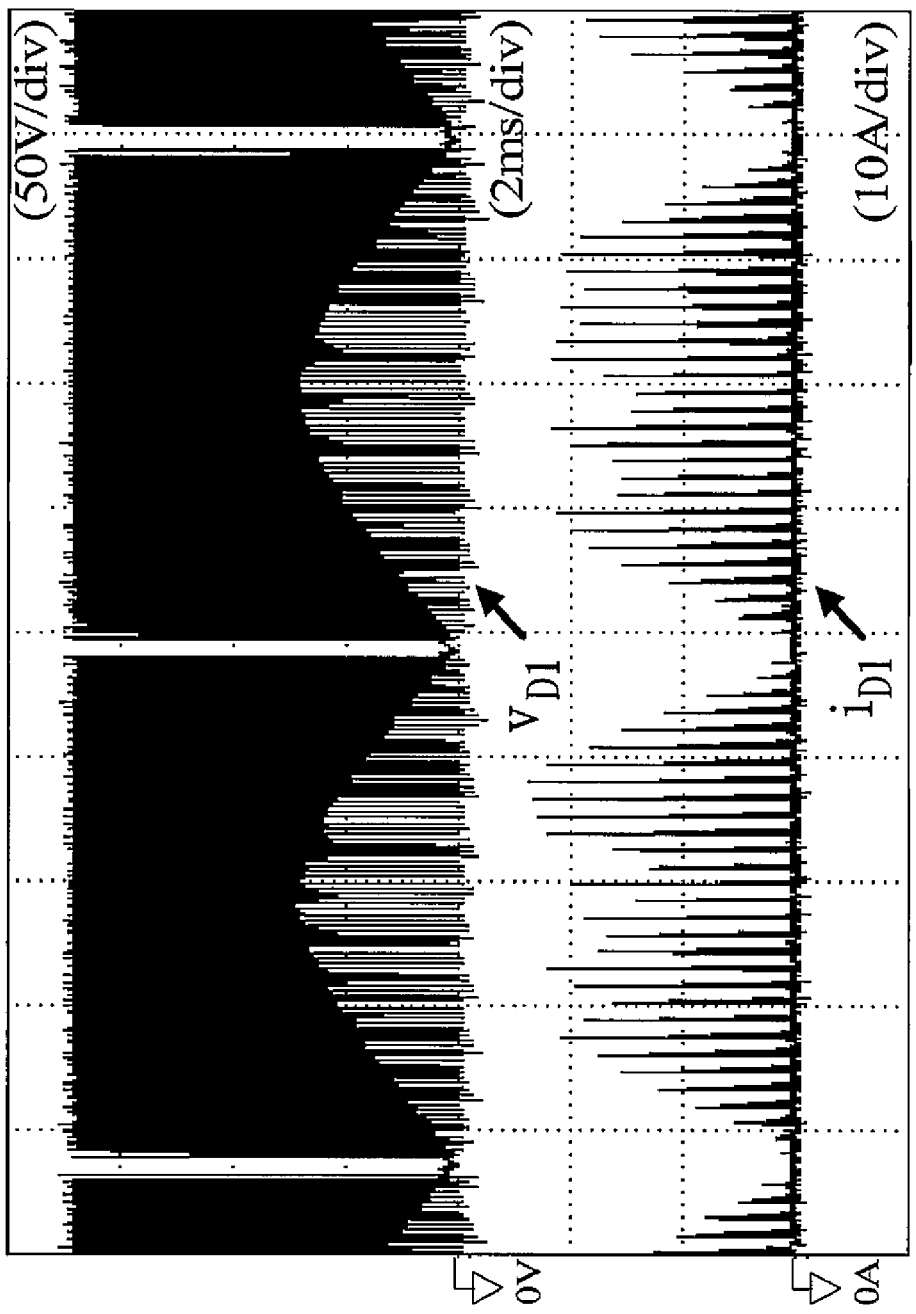

As shown in FIGS. 21 and 22, the voltage ($v_{D1}$) across the clamp diode (D1) is clamped to 170V, i.e., the DC voltage input ($V_H$), and the clamp diode (D1) has an extremely small reverse recovery current.

Figure 23:
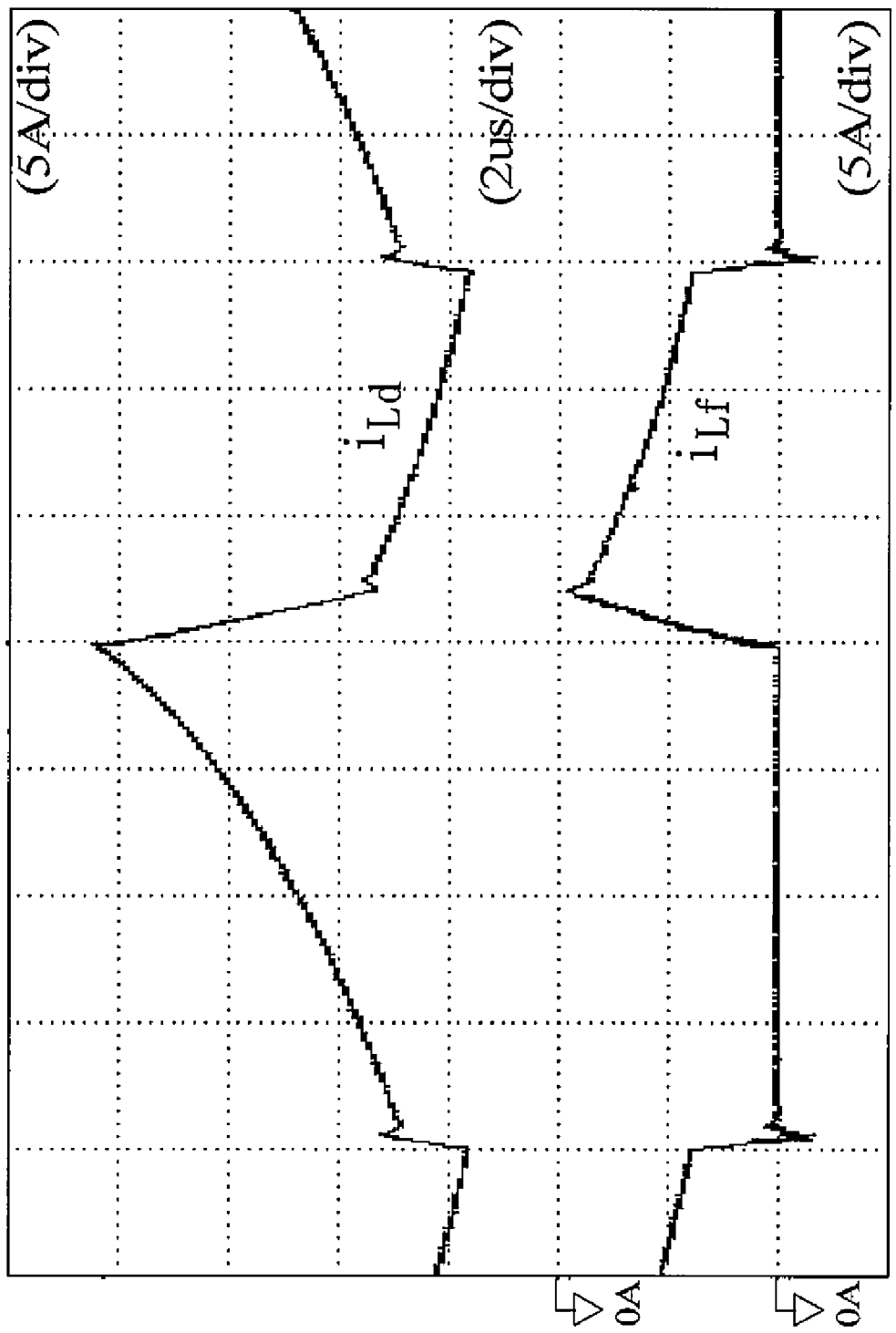
FIG. 23 is a plot illustrating experimental measurement results of the currents ($i_{Ld}$, $i_{Lf}$) flowing respectively through the first and second windings.

As shown in FIG. 23, a negative portion of the waveform of the current ($i_{Ld}$) flowing through the first winding (Ld) represents the reverse recovery current of the rectifying diode (D2).

Figure 24:
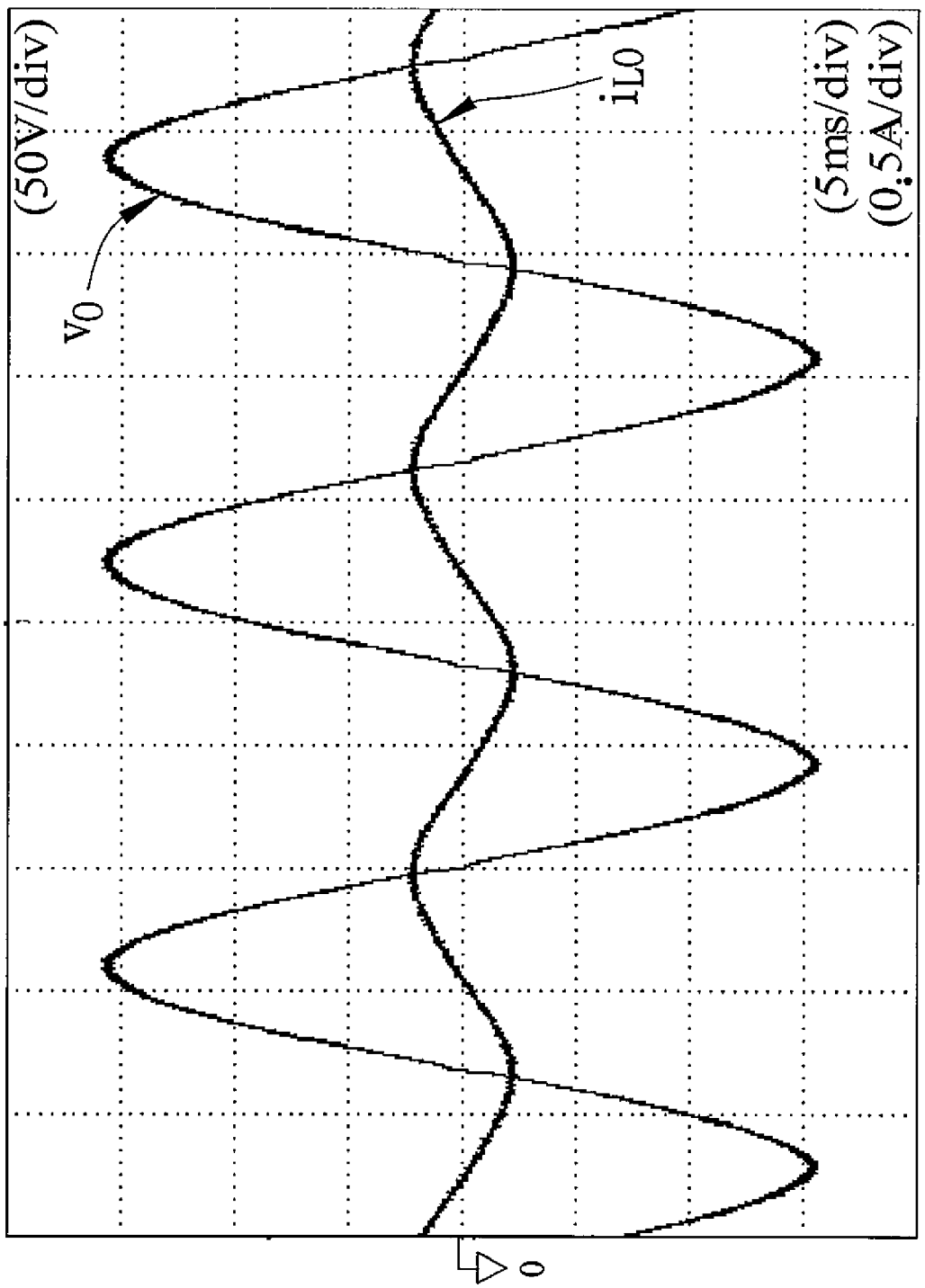
FIG. 24 is a plot illustrating experimental measurement results of the voltage ($v_O$) across the output capacitor, and the current ($i_{LO}$) flowing through the output inductor.

As shown in FIG. 24, the output inductor 52 can effectively attain zero-crossover between the positive and negative halves of the sinusoidal signal of the AC voltage output, i.e. $v_O$.

Figure 25:
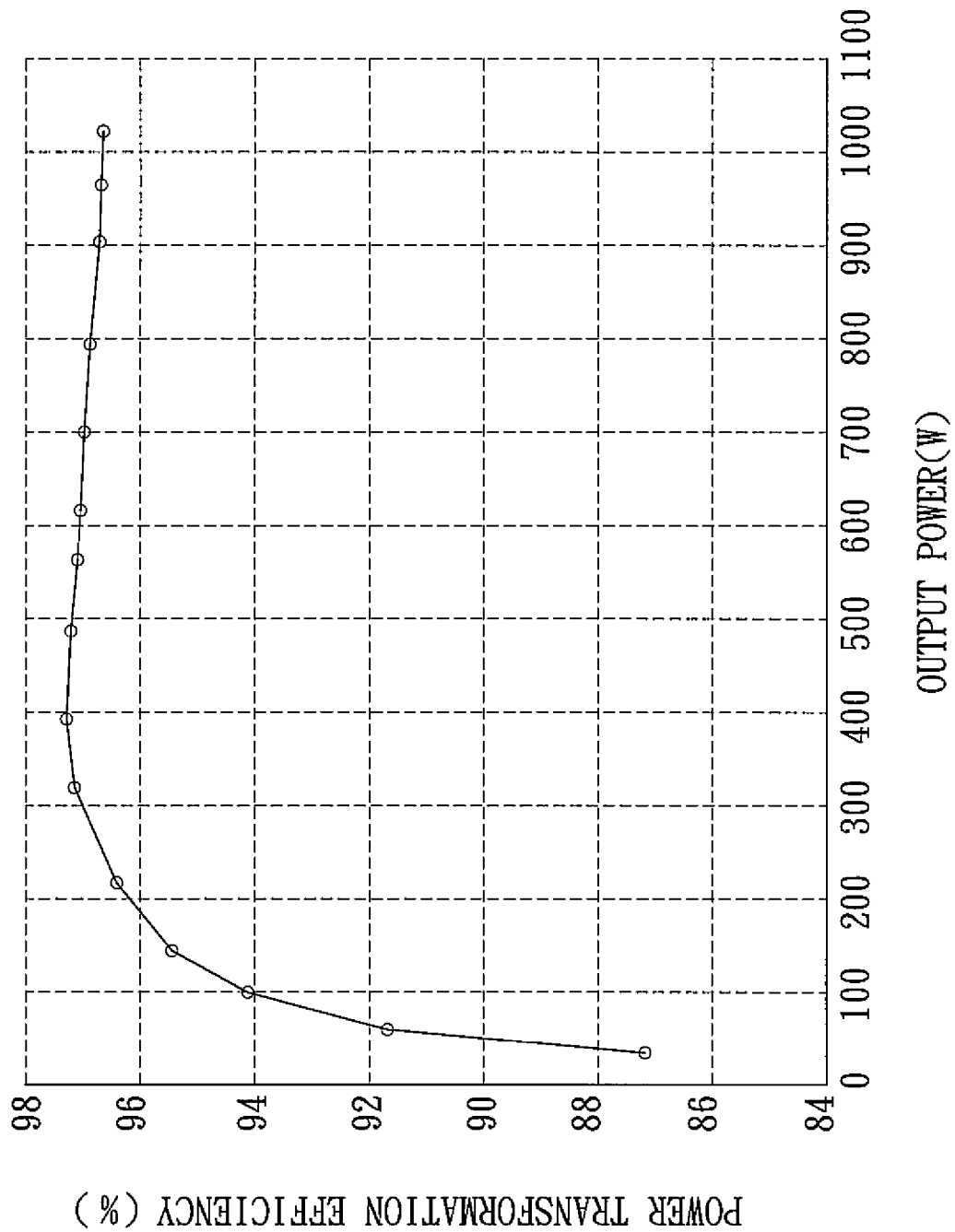
FIG. 25 is a plot illustrating experimental results of power transformation efficiency of the preferred embodiment.

FIG. 25 illustrates experimental results of power transformation efficiency of the power converting device of the first preferred embodiment operated under a condition, where the DC voltage input ($V_H$) is 170V. As shown in FIG. 25, the power converting device has a maximum power transformation efficiency of about 97.2%.

The following are some of the advantages attributed to the power converting device of the present invention:

1. The power converting device has a maximum power transformation efficiency of about 97.2%, and THD of the AC voltage output is less 2%.

2. The coupling circuit 2 has a relatively small volume. Since energy attributed to the coupling circuit 2 is fully transferred to the output side, the loop current encountered in the aforesaid conventional power converting device can be avoided. When the clamp switch (Q0) is switched at a high frequency, i.e., 70 KHz, ripples of the voltage ($v_O$) are reduced.

3. The diodes (D1, D2, D3) and the switches (Q0, Q1, Q2, Q3, Q4) have zero-current and zero-voltage switching characteristics, thereby attaining low switching loss and reducing voltage endurance specifications. All the switches (Q0, Q1, Q2, Q3, Q4) are clamped to a voltage not greater than the DC voltage input ($V_H$), thereby obtaining a relatively high power transformation efficiency.

4. Since the coupling circuit 2 can accommodate high leakage inductance component, the first and second windings (Ld, Lf) can be separately wound in a known manner, which is much easier compared to the sandwich winding manner.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A power converting device for converting a DC voltage input from an external power source into an AC voltage output, comprising:
   a coupling circuit including first and second windings each having a polarity end and a non-polarity end, said polarity end of said first winding being coupled to said non-polarity end of said second winding;
   a rectifying diode having a grounded anode, and a cathode coupled to said polarity end of said second winding;
   a clamp diode having a grounded anode, and a cathode coupled to said polarity end of said first winding;
   a clamp switch adapted to be coupled between the external power source and said cathode of said clamp diode, and operable between an ON-state and an OFF-state;
   a full-bridge circuit including a first series connection of first and second switches, and a second series connection of third and fourth switches, said first and second series connections being coupled in parallel between said non-polarity end of said first winding and ground, each of said first, second, third and fourth switches being operable between an ON-state and an OFF-state;
   and an output circuit including an output capacitor coupled between a first common node between said first and second switches, and a second common node between said third and fourth switches, the AC voltage output being a voltage across said output capacitor;
   wherein
      said first switch is coupled to said third switch, and said second switch is coupled to said fourth switch,
      said first and fourth switches are simultaneously in the ON-state, and said second and third switches are simultaneously in the ON-state, and
      when said first switch is in the ON-state, said second switch is in the OFF-state;
   wherein
      when said first and fourth switches are in the ON-state, said output capacitor is charged so that the AC voltage output is a positive half of a sinusoidal signal, and
      when said second and third switches are in the ON-state, said output capacitor is reversely charged so that the AC voltage output is a negative half of the sinusoidal signal; and
   wherein said output circuit further includes an output inductor coupled in parallel to said output capacitor and capable of drawing out energy attributed to said output capacitor during crossover between the positive and negative halves of the sinusoidal signal.

2. The power converting device as claimed in claim 1, wherein each of said first, second, third and fourth switches is in the OFF-state during crossover between the positive and negative halves of the sinusoidal signal.

3. The power converting device as claimed in claim 1, wherein each of said first, second, third and fourth switches is switched at a frequency of 60 Hz, and has a duty cycle that is less than 50%.

4. The power converting device as claimed in claim 1, wherein, during the ON-state of any one of said first, second, third and fourth switches, said clamp switch is switched at a frequency higher than that of any one of said first, second, third and fourth switches.

5. The power converting device as claimed in claim 4, wherein said clamp switch is switched at a frequency of 70 KHz.

6. The power converting device as claimed in claim 1, further comprising a feedback diode having an anode coupled to said non-polarity end of said first winding, and a cathode adapted to be coupled to the external power source.

7. The power converting device as claimed in claim 1, further comprising a filter inductor coupled to said first common node.

* * * * *